United States Patent
Hashiba et al.

(10) Patent No.: US 7,291,947 B2
(45) Date of Patent: Nov. 6, 2007

(54) ELECTRIC ROTATING MACHINE WITH BEARING SEALS

(75) Inventors: Yutaka Hashiba, Yokosuka (JP); Makoto Mikami, Tokyo (JP); Takeshi Hayashi, Yokohama (JP); Yukihiko Kazao, Yokohama (JP); Ikuo Saito, Yokohama (JP); Hidekazu Shiomi, Chiba (JP); Yoshihiro Taniyama, Tokyo (JP); Yasuo Kabata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/128,368

(22) Filed: May 13, 2005

(65) Prior Publication Data

US 2005/0206249 A1   Sep. 22, 2005

Related U.S. Application Data

(63) Continuation of application No. PCT/JP03/14481, filed on Nov. 13, 2003.

(30) Foreign Application Priority Data

Nov. 13, 2002  (JP) ............... 2002-329168
Mar. 5, 2003   (JP) ............... 2003-058273

(51) Int. Cl.
*H02K 5/10*   (2006.01)
*F16J 15/16*  (2006.01)
*F16J 15/22*  (2006.01)

(52) U.S. Cl. .................. 310/54; 310/90; 277/408; 277/422

(58) Field of Classification Search ............ 310/52–59, 310/90, 90.5; 277/408, 422, 431, 930
See application file for complete search history.

(56) References Cited

U.S. PATENT DOCUMENTS

| | | | | | |
|---|---|---|---|---|---|
| 2,159,057 | A | * | 5/1939 | Sterrett | 277/432 |
| 2,501,304 | A | * | 3/1950 | Baudry et al. | 384/132 |
| 2,743,949 | A | * | 5/1956 | Mullner | 277/543 |
| 2,968,499 | A | * | 1/1961 | Grobel | 277/411 |

(Continued)

FOREIGN PATENT DOCUMENTS

JP    34-3626    3/1959

(Continued)

OTHER PUBLICATIONS

Microfilm of the specification and drawings annexed to the request of Japanese Utility Model Application No. 159401/1987 (Laid-Open No. 63873/1989) (Mitsubishi Heavy Industries, Ltd.), Apr. 24, 1989, Full text, Figs. 1 to 4.

(Continued)

*Primary Examiner*—Karl Tamai
*Assistant Examiner*—David W. Scheuermann
(74) *Attorney, Agent, or Firm*—Oblon, Spivak, McClelland, Maier & Neustadt, P.C.

(57) ABSTRACT

Hydrogen gas is circulated to cool an electric rotating machine main body, and brush seals are provided to contact a predetermined position on the outer circumferential surface of a rotating shaft. As a result, contact of a sealing oil and the hydrogen gas, contact of a lubricating oil and the sealing oil in the bearing, and leakage of the hydrogen gas outside the machine are prevented.

4 Claims, 17 Drawing Sheets

U.S. PATENT DOCUMENTS

| | | | | |
|---|---|---|---|---|
| 4,486,024 A | * | 12/1984 | Cooper | 277/422 |
| 6,378,873 B1 | | 4/2002 | Mayer et al. | |
| 2002/0074730 A1 | * | 6/2002 | Mayer et al. | 277/355 |
| 2002/0096837 A1 | * | 7/2002 | Brunnstein et al. | 277/431 |
| 2005/0206249 A1 | | 9/2005 | Hashiba et al. | |

FOREIGN PATENT DOCUMENTS

| | | |
|---|---|---|
| JP | 5-322047 | 12/1993 |
| JP | 7-75291 | 3/1995 |
| JP | 10-14158 | 1/1998 |
| JP | 2000-120878 | 4/2000 |
| JP | 2001-28867 | 1/2001 |
| JP | 2001-50396 | 2/2001 |
| JP | 2001-90842 | 4/2001 |
| JP | 2001-317634 | 11/2001 |
| JP | 2002-81552 | 3/2002 |
| JP | 2002-206643 | 7/2002 |
| JP | 2002-303371 | 10/2002 |
| JP | 2003-161108 | 6/2003 |

OTHER PUBLICATIONS

Microfilm of the specification and drawings annexed to the request of Japanese Utility Model Application No. 169587/1980 (Laid-Open No. 93076/1982) (Tokyo Shibaura Electric Co., Ltd.), Jun. 8, 1982, Full text, Fig. 2.

U.S. Appl. No. 11/355,881, filed Feb. 17, 2006, Hashiba et al.

\* cited by examiner

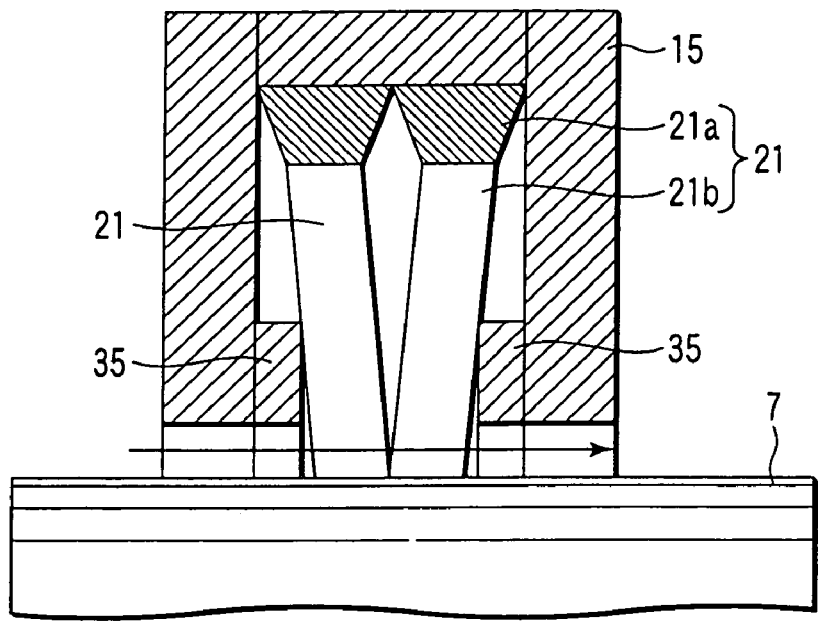
F I G. 9
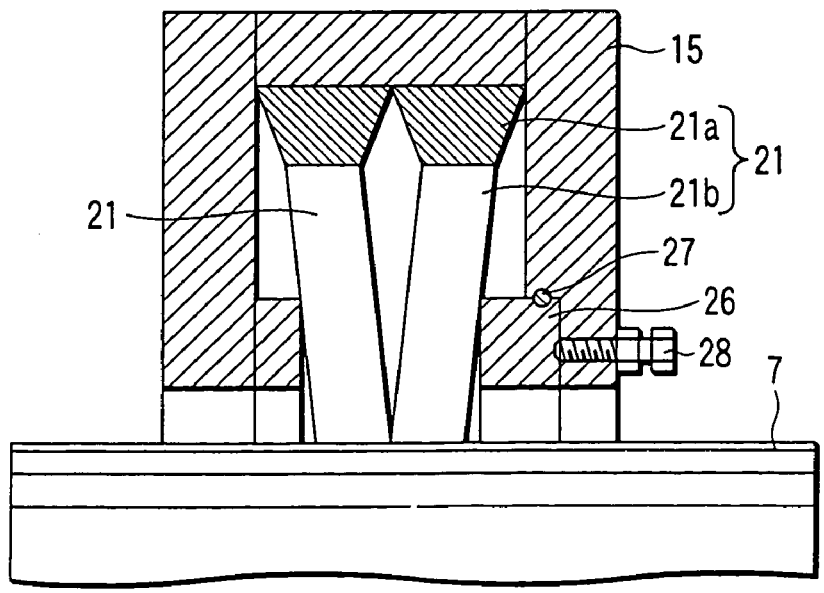
F I G. 10

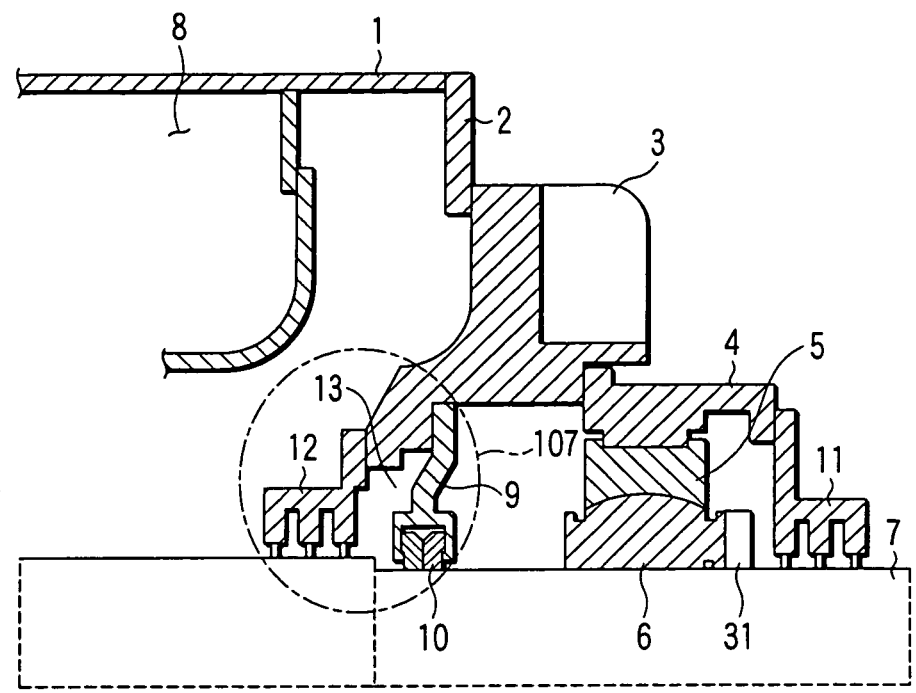
F I G. 22
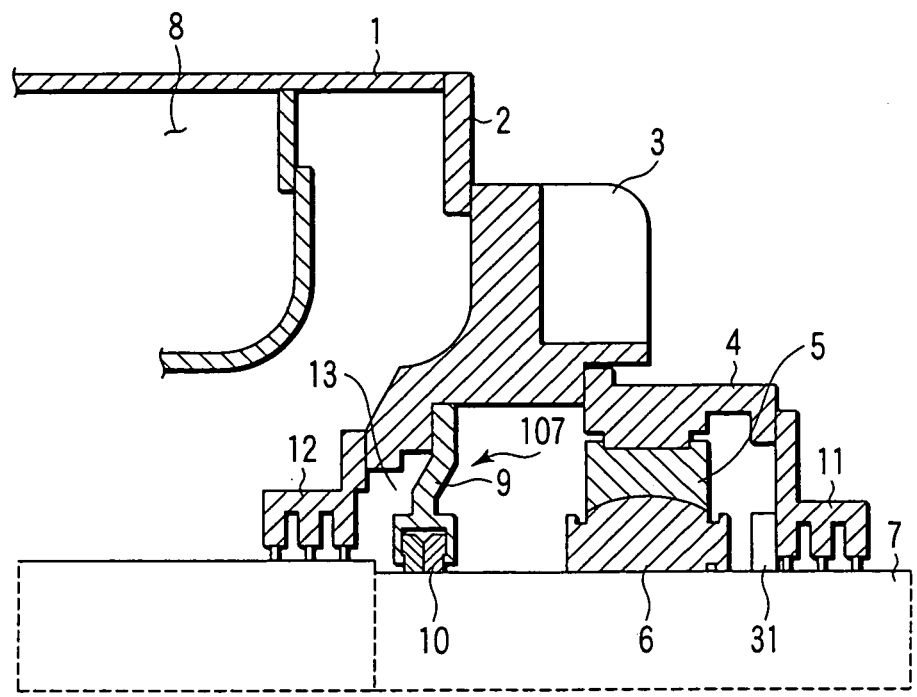
F I G. 23

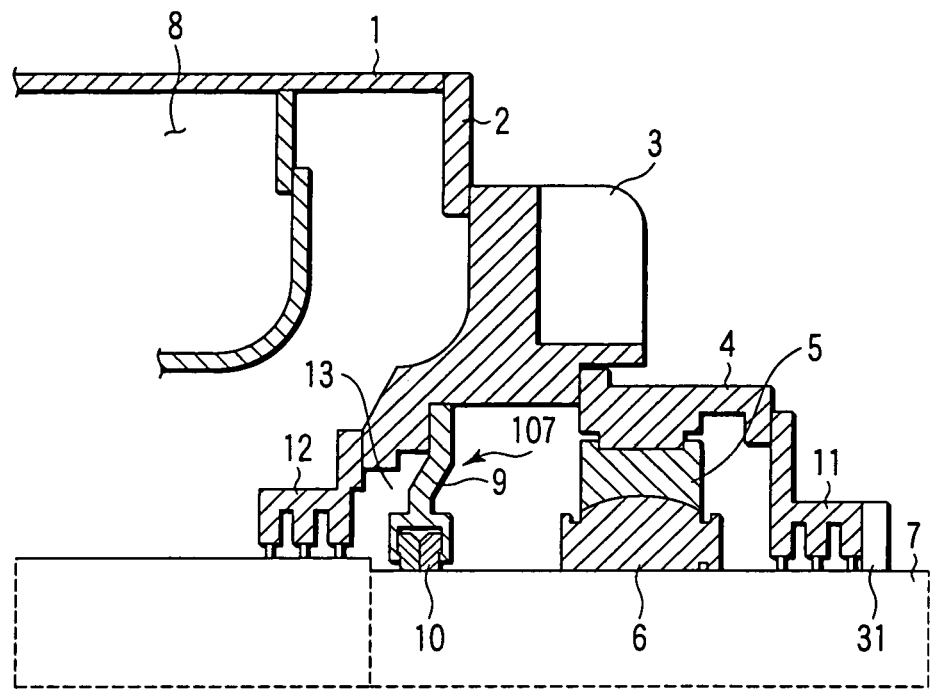
F I G. 24
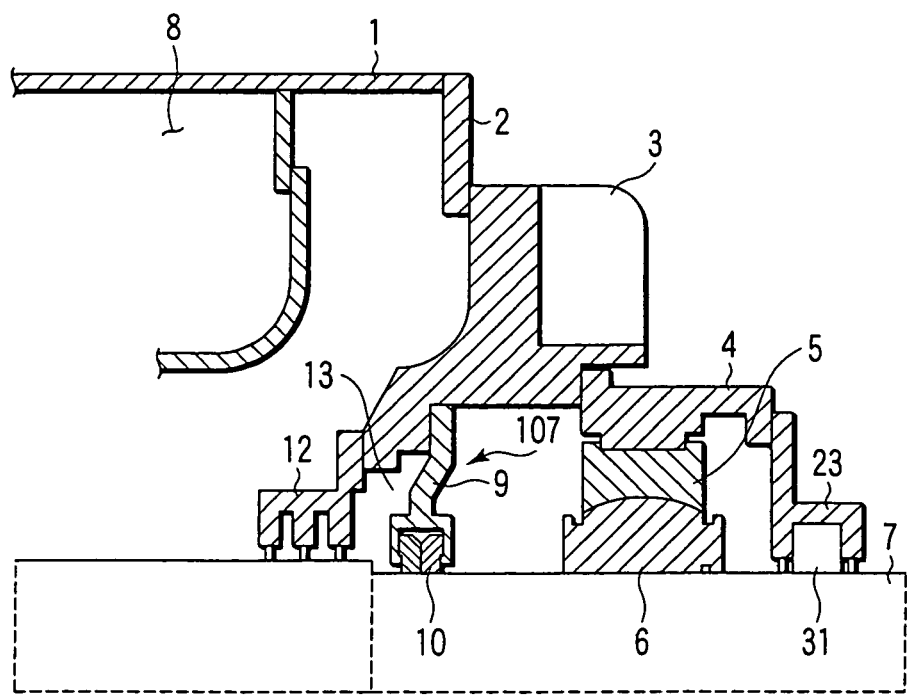
F I G. 25

ELECTRIC ROTATING MACHINE WITH BEARING SEALS

CROSS-REFERENCE TO RELATED APPLICATIONS

This is a Continuation Application of PCT Application No. PCT/JP03/14481, filed Nov. 13, 2003, which was published under PCT Article 21(2) in Japanese.

This application is based upon and claims the benefit of priority from prior Japanese Patent Applications No. 2002-329168, filed Nov. 13, 2002; and No. 2003-058273, filed Mar. 5, 2003, the entire contents of both of which are incorporated herein by reference.

BACKGROUND OF THE INVENTION

1. Field of the Invention

The present invention relates to an electric rotating machine comprising a shaft seal device which cools an electric rotating machine main body with a cooling medium such as hydrogen gas and which seals a shaft through portion.

2. Description of the Related Art

In a large capacity turbine generator, for example, pressurized hydrogen gas is sealed inside the machine, and a rotor and a stator which configure a generator main body (electric rotating machine main body) are cooled using the hydrogen gas. Because the hydrogen gas has lower density and higher specific heat capacity than air, hydrogen-cooled generator can operate in high efficiency. Therefore, many large capacity turbine generators use this cooling system. In such a hydrogen-cooled generator, shaft seal devices for preventing leakage of the hydrogen gas inside the machine, from bearings to the outside are installed at both ends of the generator (see (Prior art publication 1: Jpn. Pat. Appln. KOKAI Publication No. 7-75291) and (Prior art publication 2: Jpn. Pat. Appln. KOKAI Publication No. 10-14158)).

Now, a conventional shaft seal device will be explained with reference to the drawings. FIG. 28 is a cross-sectional view of an end of an electric rotating machine in the vicinity of a shaft seal device 99 that seals hydrogen the inside of a machine in a conventional hydrogen-cooled electric rotating machine. Reference numeral 1 is a stator frame which has a cylindrical shape, and at an end thereof, an end bracket 3 is fixed via a stator frame end plate 2. A bearing bracket 4 is fixed on the end bracket 3, a bearing stand 5 is attached inside the bearing bracket 4, and a bearing device (bearing) 6 is attached inside the bearing stand 5. The bearing 6 supports a rotating shaft (shaft) 7 to be rotatable.

A seal casing 9 and a seal ring 10 which configure the shaft seal device 99 are provided to seal hydrogen gas 8 inside the machine that is enclosed by the stator frame 1, the stator frame end plate 2, the end bracket 3 and the like not to leak from a gap formed with the rotating shaft 7 which rotates due to the movement of the electric rotating machine. In addition, oil deflectors 11 and 12 are provided inside the machine and outside the machine, respectively, such that a lubricating oil used in the shaft seal device 99 and the bearing 6 does not leak, and a space called a seal cavity 13 is provided between the internal oil thrower 12 and the shaft seal device 99.

FIG. 29 is an enlarged view showing the details of the seal casing 9 and the seal ring 10 which configure the shaft seal device 99. In FIG. 29, the seal ring 10 comprises two seal rings 10A and 10B which are aligned in the axial direction, and each of the seal rings is processed such that the inner diameter is slightly larger than the outer diameter of the rotating shaft 7.

Seal oil 17 is supplied from the seal casing 9 with slightly higher pressure than the gas pressure of the hydrogen gas for generator cooling. The sealing oil 17 is supplied to a narrow gap 19 which is formed by the seal rings 10A and 10B and the rotating shaft 7 via an axial direction gap 18 between the seal ring 10A and 10B. By forming an oil film here, leakage of the hydrogen gas 8 inside the machine to the outside the machine is prevented. A spring 20 presses the seal rings 10A and 10B, and adjusts a circumferential direction gap 19 between the rotating shaft 7 and the seal ring 10A and 10B.

FIG. 30 is a cross-sectional view along the arrow 30-30 in FIG. 29, and the seal ring 10B is formed of a seal ring upper half portion 10Ba and a seal ring lower half portion 10Bb which form a radial arc in the axial direction with respect to the rotating shaft 7. The seal ring 10A is same as the seal ring 10B.

The spring 20 is fixed by screws 20a provided in the seal casing 9. The spring 20 is disposed in an annular state along the joint between the seal ring 10A and the seal ring 10B, and forms the circumferential direction gap 19 with the rotating shaft 7 with an optimal pressing force. An optimal amount of oil is supplied by adjusting the circumferential direction gap 19 to fill the circumferential direction gap 19 with the sealing oil 17 and the hydrogen gas 8 can be sealed inside the machine.

The sealing oil 17 which has flowed outward from the circumferential direction gap 19 flows to the seal cavity 13 side and the bearing device side. The sealing oil 17 which has flowed outward to the seal cavity 13 side is recovered alone or alternatively, the sealing oil which has flowed out to the bearing device side is recovered together with the lubricating oil from the bearing device 6. Each of the oils recovered are combined again after collection, and as shown in FIG. 31, they are pressurized using a pressure pump 59 and sent to the shaft seal device and the bearing device, respectively. However, the sealing oil 17 which has flowed from the circumferential direction gap 19 to the bearing device 6 side and the lubricating oil from the bearing device are surrounded by air, and thus return to the pressure pump 59 in a state in which air is mixed in the oil. Because the oils are sent to the shaft seal device after pressure is applied, part of the air mixed into the sealing oil 17 that has flowed from the circumferential direction gap 19 to the seal cavity 13 side blows out to the seal cavity 13 side. Instead, the hydrogen gas 13 inside the machine which is inside the seal cavity 13 is mixed with the seal oil 17 and discharged outside the machine. The air blown into the seal cavity 13 replaces the hydrogen gas 8 inside the machine via the gap between the deflector 12 and the rotating shaft 7, and as a result, the purity of the hydrogen gas 8 inside the machine is lowered.

In order to avoid this, in the typical shaft seal device, the oils are subjected to degassing in a degassing device 58 before entering the pressure pump 59, and the oils are supplied to the shaft seal device or the bearing device 6 in a state in which gas such as the cooling hydrogen gas 8 or air is not mixed in the oils.

However, the suction processing device 58 is of a comparatively high cost, and this is one factor causing increased cost for the electric rotating machine in which hydrogen gas or the like is used as the cooling medium.

It is to be noted that in FIG. 31, aside from the above-described configuration, the dynamo-electrical machine main body may be contained in the frame or it may comprise a hydrogen extracting device 55 which extracts hydrogen gas circulating in a circulating system (not shown), an air extracting device 56 for extracting air from the lubricating oil in the shaft seal device 6, a lubricating oil system 57 for sending the lubricating oil from which air has been removed to the degassing device 58 and the bearing device 6.

Aside from the prior art example of the shaft seal device described above, there is also a non-contact type sealing device configured as follows. As shown in, for example, FIG. 28, the seal ring 10 is contained inside the seal casing 9 attached to the end bracket 22, and the spring 20 is supported so as to form a narrow gap between itself and the rotating shaft 7. The seal rings 10 are arranged in 2 rows in the axial direction of the rotating shaft 7, and oil of a pressure that is slightly higher than the gas pressure inside the machine is supplied from the outside to the gap between the sealing 10 and the rotating shaft 7. The pressure oil passes through the gap, and the gas inside the machine is sealed due to the formation of leaking oil as shown by the arrow in FIG. 29. In this type of configuration, because the seal ring 10, the seal casing 9 and the rotating shaft 7 etc. are thermally deformed in a complex manner during operation, the seal oil amount (purge oil amount) may exceed a design value and sometimes increases more than expected in transition (particularly at the time of startup). Furthermore, the thickness of the oil film decreases locally due to deformation, and vibration is caused by the frictional force of that portion. In recent years, development of a brush type contact seal for solving these problems has been progressing, and this is being used as an air seal for a gas turbine or steam turbine, a liquid seal for low pressure difference, or a dust-protective seal. However, in a liquid seal for high pressure difference using a liquid as the sealing medium (purge oil), such as in a gas sealing inside the turbine generator, sufficient sealing properties can not be obtained, and further, a large amount of sealing oil is necessary.

Aside from the prior arts described above, there are also Prior art publication 3 (Jpn. Pat. Appln. KOKAI Publication No. 2002-81552), Prior art publication 4 (Jpn. Pat. Appln. KOKAI Publication No. 2003-161108), Prior art publication 5 (Jpn. Pat. Appln. KOKAI Publication No. 2002-303371) and Prior art publication 6 (Jpn. Pat. Appln. KOKAI Publication No. 2001-90842).

In Prior art publication 3, a rotating body like a rotating shaft has an improved brush sealing device which is provided at a portion that penetrates a pressure partition wall and is described as follows. That is, this example describes the brush seal device having a structure with "a plurality of brush seal segments that are divided in the circumferential direction", in order to disassemble the device and to facilitate the removal of the internal rotating shaft at the time of manufacture, or at the time of inspection after operation has begun. However, there is no description of any measures for dealing with possible dropping of the brush seal due to the pressure of the leaking oil.

Prior art publication 4 merely describes a structure for facilitating attachment and removal in the installation method for a sealing device and for preventing installation error. In this sealing device, a labyrinth seal is used together with a brush seal in order to improve the sealing properties of the rotating shaft in a turbo device having a labyrinth seal. Prior art publication 4 is a labyrinth seal, and the labyrinth seal is a sealing mechanism which suppresses the leakage of fluid from the high pressure side to the low pressure side with the labyrinth seal interposed therebetween, and is different from the oil deflector which is disposed with the bearing interposed therebetween. Basically, in the oil deflector, the fluid pressure at both sides where the oil deflector is nipped is the same and it does not limit the amount of fluid leakage. In addition, the purpose of the oil deflector is to prevent or suppress the leakage of mist oil or liquid oil and it is thus different from the labyrinth seal.

Meanwhile, in the Prior art publication 4, operational effects of the labyrinth seal are described in which sealing properties are improved by providing a back plate at the high pressure side of the labyrinth seal and at the low pressure side of the brush seal, or alternatively, the sealing properties are improved by attaching a brush seal to both sides of the labyrinth seal, but this is different from the oil deflector.

The Prior art publication 5 describes a device in which oil mist (oil particles in a mist-like state) is sealed in a bearing cavity. In order to seal the oil mist that is generated in the bearing cavity inside the bearing cavity, the bearing cavity may be attached to one side of the bearing housing or at the side surfaces at both sides. Thus, while Prior art publication 5 seals oil mist (oil particles in a mist-like state) inside the bearing cavity, one is the type in which the liquid oil (usually called side leak) that is blown out from the side surface of the bearing and the sealing oil of the shaft seal device that uses the oil which seals the gas inside the machine are separated (not caused to contact each other), and the other one is the type in which all the oils used in the machine (sealing oil and bearing oil) are cut-off so as not to contact the outside air. Thus, both types are not necessarily provided at the bearing side surface.

Prior art publication 6 describes that a special kind of brush (in which extremely fine fibers are woven) is used to reduce the leakage of fluid, and there is no abnormal charge which is different from that of a metal brush, and no breakage as in the case of the metal brush and the ceramic brush. However, the brush seal that uses this special kind of brush is attached to a machine having a pressure difference between the inside and the outside the machine, and it clearly different from one that basically does not seal a pressure difference.

BRIEF SUMMARY OF THE INVENTION

A first object of the invention is to provide an electric rotating machine which comprises a shaft seal device capable of preventing contact of cooling gas and sealing oil and suppressing the reduction in purity of the cooling gas inside the machine without degassing of the sealing oil.

A second object of the invention is to provide an electric rotating machine in which a small amount of oil is sufficient for all operating conditions from startup to regular rotation and there is no excessive change in oil quantity, the electric rotating machine further comprising a highly pressure resistant brush type contact sealing device which has excellent vibration stability.

A third object of the invention is to provide an electric rotating machine, in which purity of the cooling medium in the machine is not lowered, and it is unnecessary to suction the sealing medium before feeding, the electric rotating machine comprising a low-cost shaft seal device which does not require a degassing device.

To achieve abovementioned subject matter, an electric rotating machine according the first aspect of the invention, comprises: a bearing device which rotatably supports a rotating shaft configures a rotor in a frame containing an electric rotating machine main body; a cooling medium circulating system to circulate a cooling medium within the frame to cool the electric rotating machine main body; a seal ring device which supplies a sealing medium to the outer circumferential surface side of the rotating shaft, and prevents the cooling medium from leaking to outside the frame; a sealing mechanism which is arranged to contact an outer circumferential surface of the rotating shaft, and prevents the cooling medium and the sealing medium, or the sealing medium and/or a lubricating medium inside the bearing device from contacting the outside air.

To achieve abovementioned subject matter, an electric rotating machine according the second aspect of the invention, comprises: a bearing device in which a rotating shaft having a rotor is rotatably supported inside a frame which contains an electric rotating machine main body; a cooling medium circulating system to circulate a cooling medium within the frame to cool the electric rotating machine main body; an oil deflector which is disposed on an outer circumferential surface of the rotating shaft which is on at least one of the inner side and the outer side of the frame of the bearing device and which prevents a lubricant supplied to the bearing device from flowing inside the frame or from flowing outside the frame; a sealing device which is disposed to form a cavity inside the frame and between the bearing device and the oil deflector at the inner side of the frame, and which supplies a sealing medium to the outer circumferential surface side of the rotating shaft to prevent the cooling medium from leaking to the outer side of the frame; and a sealing mechanism which is arranged to contact the outer circumferential surface of the rotating shaft, and which prevents the cooling medium and a medium within the seal cavity, or the cooling medium and the sealing medium or the sealing medium and/or a lubricating medium inside the bearing device from contacting the outside air.

To achieve abovementioned subject matter, an electric rotating machine according the third aspect of the invention, comprises: a bearing device which rotatably supports a rotating shaft configures a rotor inside a frame which contains an electric rotating machine main body; a cooling medium system which supplies a cooling medium within the frame to cool the electric rotating machine main body; a brush holder which is mounted on at least one of inner and outer part of the frame, and forms a predetermined storage space by surrounding the outer circumferential side of the rotating shaft; a brush sealing mechanism main body which comprises: a circular ring shaped brush seal which is in the brush holder and contained such that a plurality of stages are formed in the axial direction of the rotating shaft, each stage contacting the rotating shaft; and a support portion for supporting the brush seal at each of the reverse rotating shaft sides, each of the brush seals having a plurality of divisions in the radial direction along the axial direction, the position of the division of each stage of adjacent brush seals being offset, and no cooling medium in the frame leaking to the outer portion of the frame; and a drop prevention member which prevents the brush seal in the brush holder from dropping in the axial direction due to a pressure difference between the cooling medium and outside the frame.

To achieve abovementioned subject matter, an electric rotating machine according the fourth aspect of the invention, comprises: a bearing device which rotatably supports a rotating shaft configuring a rotor inside a frame which contains an electric rotating machine main body; a lubricating medium circulating system to circulate a lubricating medium in the bearing device; a cooling medium circulating system to circulate a cooling medium within the frame to cooling the electric rotating machine main body; an oil deflector which is disposed on the outer circumferential surface of the rotating shaft which is on the inner side and/or the outer side of the frame of the bearing device and prevents a lubricant that is supplied to the bearing device from flowing inside the frame or from flowing outside the frame; a seal ring device which is disposed inside the frame further toward inside the machine than the bearing device, supplies a sealing medium to the outer circumferential surface side of the rotating shaft, and prevents the cooling medium from leaking to the outer side of the frame; and a sealing mechanism which is formed of a brush seal to contact the outer circumferential surface of the rotating shaft, and prevents the sealing medium and the lubricating medium from contacting each other.

To achieve abovementioned subject matter, an electric rotating machine according the fifth aspect of the invention, comprises: a bearing device which rotatably supports a rotating shaft configuring a rotor inside a frame which contains an electric rotating machine main body; a lubricating medium circulating system which circulates a lubricating medium in the bearing; a cooling medium circulating system which circulates a cooling medium in the frame to cool the electric rotating machine main body; an oil deflector which is disposed to contact the outer circumferential surface of the rotating shaft which is on the inner side and/or the outer side of a frame of the bearing device, and prevents a lubricant that is supplied to the bearing device from flowing inside the frame or from flowing outside the frame; and a sealing mechanism which positioned at out side of the bearing or at outer side from the bearing, includes configuration including a brush seal to contact the outer circumferential surface of the rotating shaft, and prevents the sealing medium and the outside air from contacting each other.

To achieve abovementioned subject matter, an electric rotating machine according the sixth aspect of the invention, comprises: a bearing device which rotatably supports a rotating shaft configuring a rotor inside a frame which contains an electric rotating machine main body; a lubricating medium circulating system to circulate a lubricating medium in the bearing device; a cooling medium circulating system to circulate a cooling medium within the frame to cool the electric rotating machine main body; an oil deflector which is disposed on the outer circumferential surface of the rotating shaft which is on the inner side and/or the outer side of the frame of the bearing device, and prevents a lubricant that is supplied to the bearing device from flowing inside the frame from flowing outside the frame; a seal ring device which is disposed inside the frame further toward the inner frame than the bearing device, and supplies sealing medium to the outer circumferential surface side of the rotating shaft and prevents the cooling medium from leaking to the outer side of the frame; and a sealing mechanism which is inside the frame of the bearing device, is formed of a brush seal to contact the outer circumferential surface of the rotating shaft, prevents the cooling medium and the lubricating medium in the bearing device from contacting each other and prevents the cooling medium from leaking to outer side of the machine.

To achieve abovementioned subject matter, an electric rotating machine according the seventh aspect of the invention, comprises: a bearing device which rotatably supports a rotating shaft configuring a rotor inside a frame which contains an electric rotating machine main body; a lubricating medium circulating system to circulate a lubricating medium in the bearing device; a cooling medium circulating system to circulate a cooling medium within the frame to cool the electric rotating machine main body; an oil deflector which is disposed on the outer circumferential surface of the rotating shaft which is on the inner side and/or the outer side of the frame of the bearing device, and which prevents a lubricant that is supplied to the bearing device from flowing inside the frame or from flowing outside the frame; and a sealing mechanism which is outside the frame of the bearing device, is formed of a brush seal to contact the outer circumferential surface of the rotating shaft, and prevents the lubricating medium and the sealing medium in the bearing device from contacting each other.

BRIEF DESCRIPTION OF THE SEVERAL VIEWS OF THE DRAWING

FIG. 9 is an explanatory view showing a drop prevention method for brushes according to an eight embodiment of the invention.

FIG. 10 is an explanatory view showing another drop prevention method for brushes according to the eight embodiment of the invention shown in FIG. 9.

FIG. 22 is an axial direction cross-sectional view of an area around a shaft seal device according to an eighteenth embodiment of the invention.

FIG. 23 is an axial direction cross-sectional view of the area around the shaft seal device according to a modification of the eighteenth embodiment of the invention.

FIG. 24 is an axial direction cross-sectional view of the area around the shaft seal device according to another modification of the eighteenth embodiment of the invention.

FIG. 25 is an axial direction cross-sectional view of an area around a shaft seal device according to another modification of the eighteenth embodiment of the invention.

DETAILED DESCRIPTION OF THE INVENTION

Figure 1:
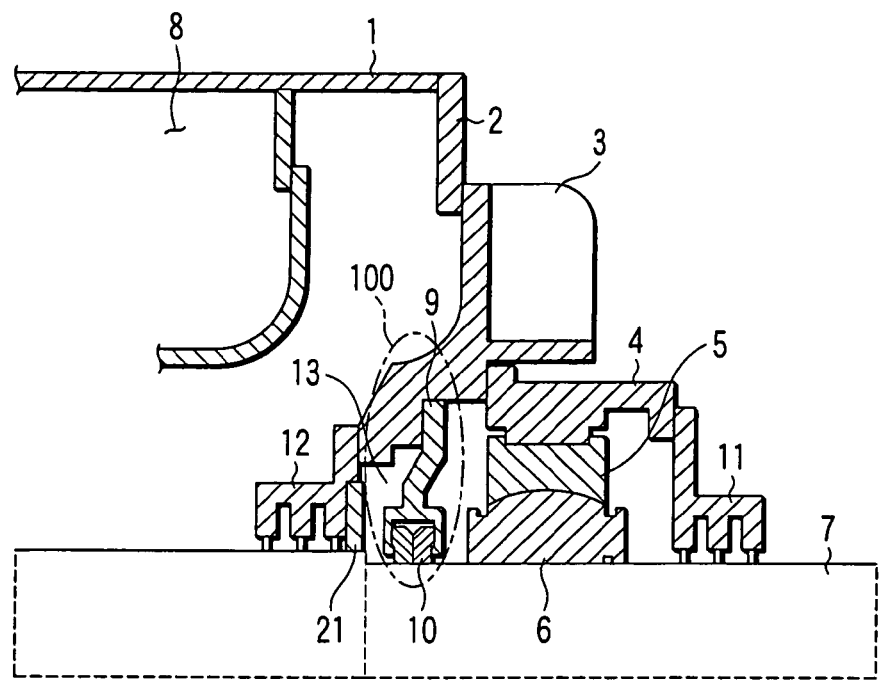
FIG. 1 is a cross-sectional view showing an end of an electric rotating machine comprising a shaft seal device according to a first embodiment of the invention.

Now, embodiments of an electric rotating machine including a shaft seal device according to the invention will be explained with reference to the drawings. FIG. 1 is an axial direction cross-sectional view of an area around a shaft seal device of an electric rotating machine showing a first embodiment of the invention, and it differs from FIG. 28 which shows the prior art described above, in that a brush seal 21 serving as a sealing mechanism which does not require a lubricating member formed of a seal brush is provided at a seal cavity 13 of an internal oil deflector 12. In other words, in this embodiment, a shaft seal device 100 is formed of a seal ring 10 mounted inside a seal casing 9 and the brush seal 21 mounted on the internal oil deflector 12.

In the thus configured shaft seal device 100 of the electric rotating machine according to the first embodiment, a hydrogen gas 8 which is used as a cooling medium inside the machine attempts to enter the seal cavity 13 from the gap between the internal oil deflector 12 and a rotating shaft 7 due to the agitation effect of the internal pressure and the rotating shaft 7 or the like. However, since the brush seal 21 which basically does not have any gap between itself and the rotating shaft 7 is mounted at the seal cavity 13 side on the internal oil deflector 12, the hydrogen gas 8 does not enter the seal cavity 13.

Accordingly, a sealing oil 17 enters the seal cavity 13, but the sealing oil 17 and the hydrogen gas 8 never come in contact with each other, and thus the purity of the hydrogen gas 8 inside the machine is never lowered due to mixing of gases (air) with the sealing oil 17. As a result, it is unnecessary for the sealing oil 17 to undergo degassing, and it is unnecessary to provide a degassing device 58 in a lubricating oil supply system shown in FIG. 31. In this case, it is necessary to supply (fill with) a sealing medium such as a sealing oil such that air is not mixed in between the seal ring and the rotating shaft 7.

It is to be noted that the brush seal 21 naturally requires no lubricating member according to the properties thereof. Also, the brush 21 may be replaced by a seal ring having a white metal on the inner circumferential surface thereof.

Figure 2:
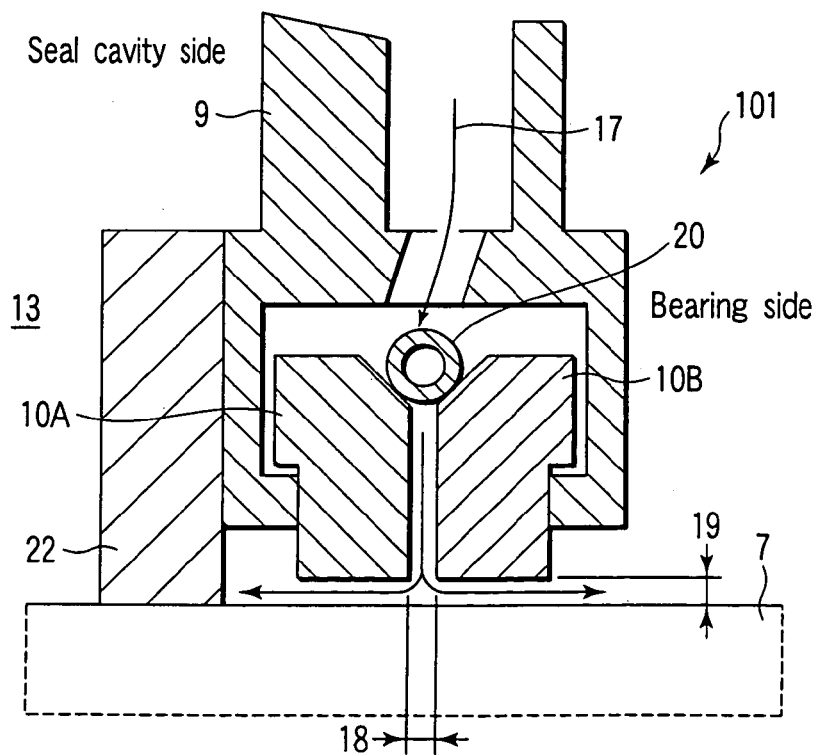
FIG. 2 is a cross-sectional view showing a shaft seal device of an electric rotating machine according to a second embodiment of the invention.

Next, a second embodiment of the shaft seal device of the electric rotating machine of the invention will be described with reference to FIG. 2. That is, a structure is provided in which a brush seal 22 which is a sealing mechanism is mounted at the seal cavity 13 side of the seal casing 9 which holds seal rings 10A and 10B which are the same as that of the prior art is mounted.

In a shaft seal device 101 of the second embodiment having this configuration, the sealing oil is caused to flow from an axial direction gap 18 of the seal ring 10A at the seal cavity side and the seal ring 10B at the bearing side to narrow gaps 19 between the seal ring 10A and rotating shaft 7, and between the seal ring 10B and the rotating shaft 7, respectively, and then caused to flow out to the seal cavity side and the bearing side, respectively. However, because the brush seal 22 is provided at the seal cavity 13 side, the sealing oil 17 which flows out to the seal cavity 13 side never flows out to the seal cavity 13.

Thus, the hydrogen gas 8 which enters the seal cavity 13 from the gap between the internal oil deflector 12 and the rotating shaft 7 does not come in contact with the sealing oil 17. Consequently, even if the air from the outside mixes with the sealing oils 17, the purity of the hydrogen gas 8 which is used as cooling gas inside the machine is never lowered, and it is unnecessary for degassing the sealing oil 17. Thus, it is unnecessary to provide the degassing device 58 in the lubricating oil supply system shown in FIG. 31 of the prior art.

Figure 3:
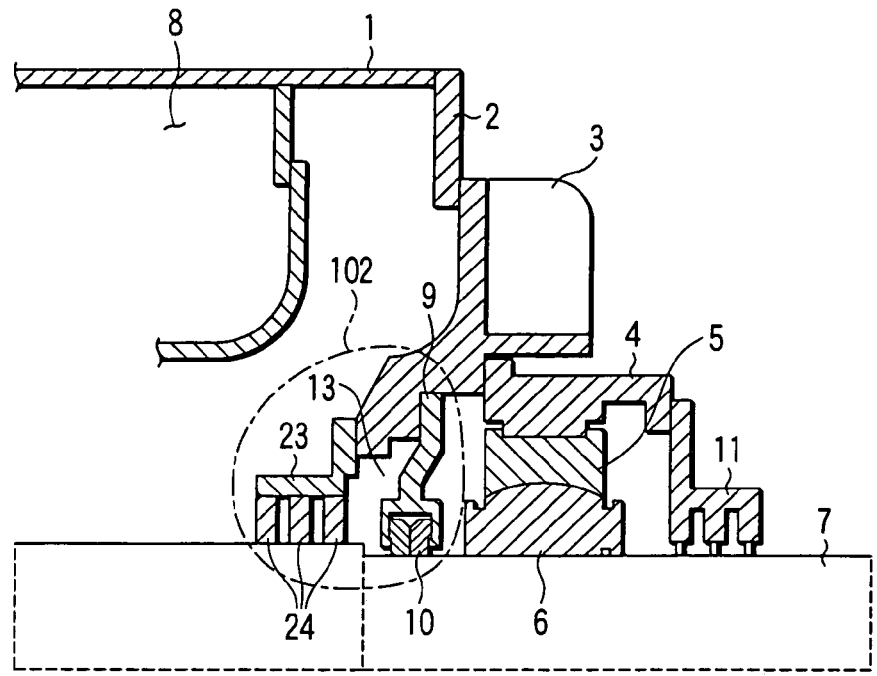
FIG. 3 is a cross-sectional view showing an end of an electric rotating machine comprising a shaft seal device according to a third embodiment of the invention.
Figure 28:
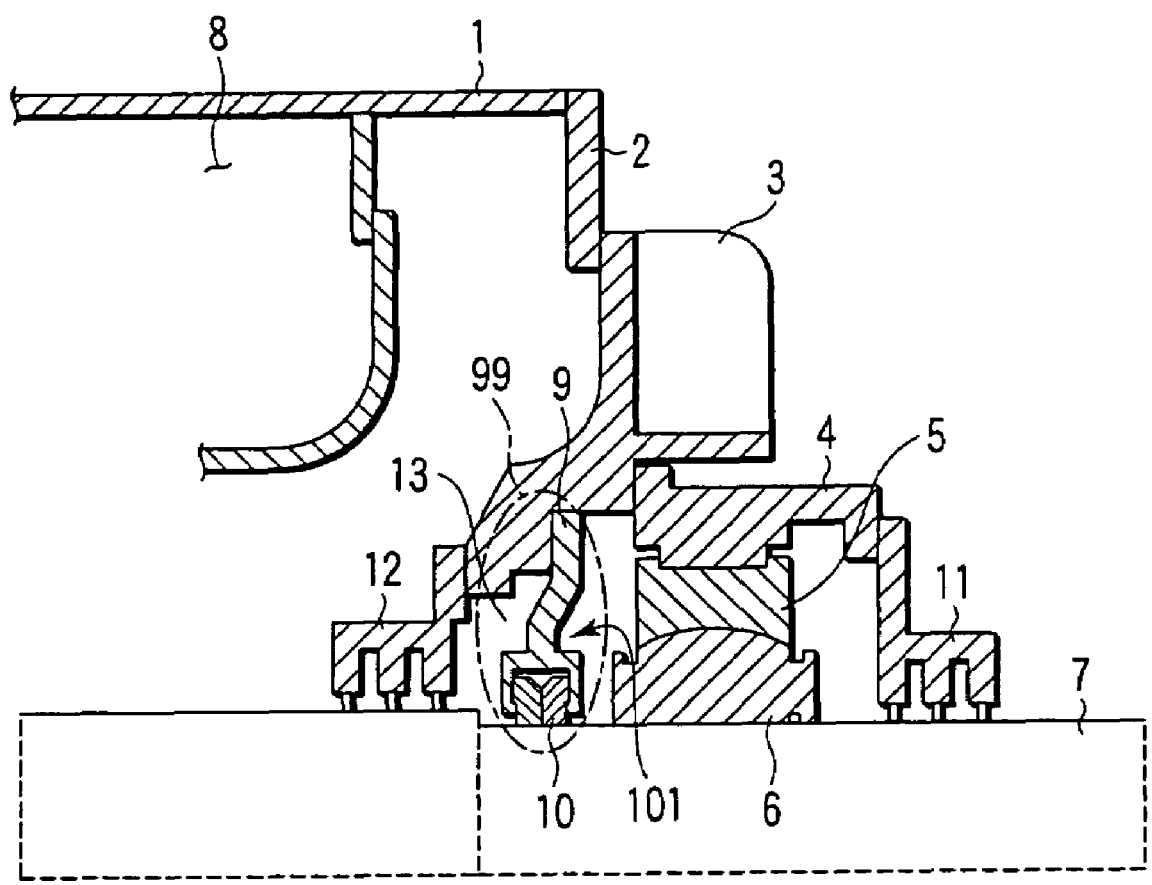
FIG. 28 is a cross-sectional view of the conventional shaft seal device.

Next, a third embodiment of the shaft seal device of the electric rotating machine of the invention will be described with reference to FIG. 3. In this embodiment, the internal oil deflector 12 of FIG. 28 is not provided, and a sealing mechanism which does not require a lubricating member, e.g., a seal brush 24, is supported by a brush seal holder 23 and is mounted to an end bracket 3 at this portion. The brush seal 24 is provided with multiple stages in the axial direction (3 stages in FIG. 3). A shaft seal device 102 is configured by the brush seal 24 and the seal ring 10 which is mounted on the seal casing 9.

In the third embodiment as configured above, the hydrogen gas 8 which is use as the cooling gas inside the machine is hindered from entering the seal cavity 13 by the brush seal 24. In addition, the sealing oil 17 which flows out from the gap between the seal ring 10 and the rotating shaft 7 is hindered from going out from the seal cavity 13 to inside the machine by the brush 24 in the same manner. Accordingly, because the hydrogen gas 8 inside the machine and the sealing oil 17 never come in contact with each other, the air mixed with the sealing oil 17 is not discharged into the hydrogen gas 8 inside the machine even if air mixes into the sealing oil 17, and thus, the hydrogen gas purity is not lowered. Therefore, it is unnecessary to provide a degassing device in the supply system of the sealing oil 17 for degassing the sealing oil 17, and thus, it is unnecessary to provide the degassing device 58 of the supply system of the sealing oil 17 shown in FIG. 31 which has been necessary in the shaft seal device of the prior art electric rotating machine.

Figure 4:
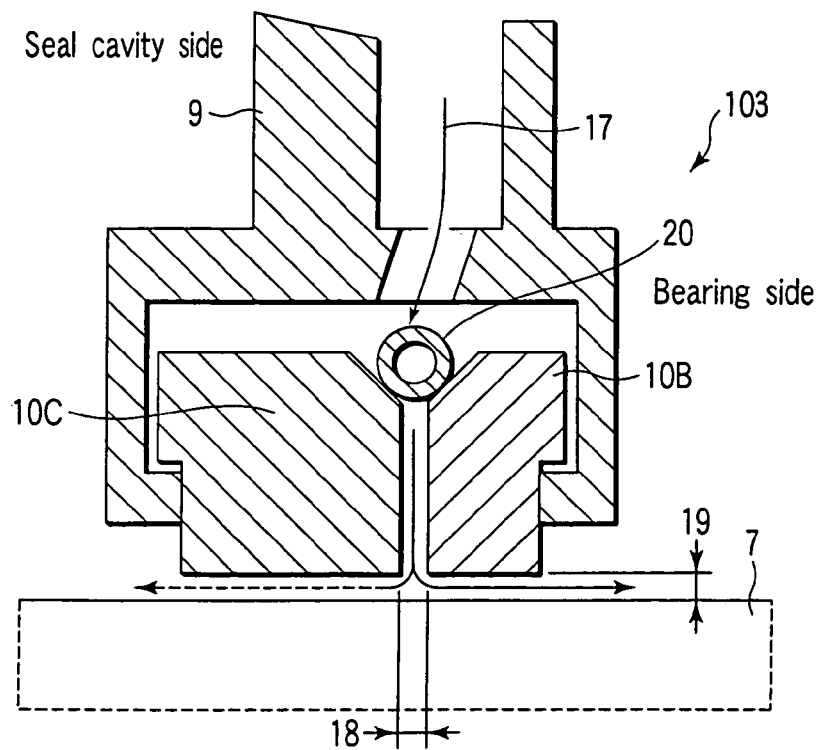
FIG. 4 is a cross-sectional view showing a shaft seal device of an electric rotating machine according to a fourth embodiment of the invention.

Next, a fourth embodiment of the electric rotating machine including the shaft seal device of the invention will be described. As shown in FIG. 4, in this embodiment, in the seal ring 10 formed of a seal ring 10C at the seal cavity side and the seal ring 10B at the bearing side, the axial direction length (width) of the seal ring 10C is longer than the axial direction length (width) of the seal ring 10B.

In the seal ring device 103 of the fourth embodiment formed in this manner, the sealing oil 17 flows from the axial direction gap 18 of the seal ring 10 into the narrow gaps 19 between seal ring 10C and the rotating shaft 7, and between the seal ring 10B and the rotating shaft 7, respectively, and flows out to the seal cavity side and the bearing side, respectively.

At this time, because the seal ring 10C at the seal cavity side has a longer axial direction length than the seal ring 10B at the bearing side, the flow path resistance when the sealing oil 17 flows to the axial direction gap (narrow gap) 19 is larger than that of the seal ring 10B at the bearing side. As a result, even for the gap 19 in the same circumferential direction, the sealing oil that flows to out to the seal cavity 13 side (shown by a dotted arrow in the drawing) is less than the sealing oil 17 that flows out to the bearing side.

By adjusting the axial direction length of the seal ring 10C at the cavity side and the seal ring 10B at the bearing side in this manner, the amount of the sealing oil 17 that flows out to the seal cavity 13 side is extremely small, so that the amount of the air mixed in the sealing oil 17 that is discharged to the hydrogen gas 8 inside the seal cavity 13 is extremely small.

The fourth embodiment has the same configuration as that of the prior art except the shape of the seal ring 10C at the seal cavity side, and the seal cavity 13 is formed of the internal oil deflector 12 that is further inside the machine. Because the amount of the cooling hydrogen gas 8 circulating in inside the machine and the hydrogen gas 8 circulating at the seal cavity 13 side is lowered due to the presence of the internal oil deflector 12, the extent to which the air mixed in the sealing oil 17 reduces the purity of the hydrogen gas 8 inside the machine is extremely low.

Figure 31:
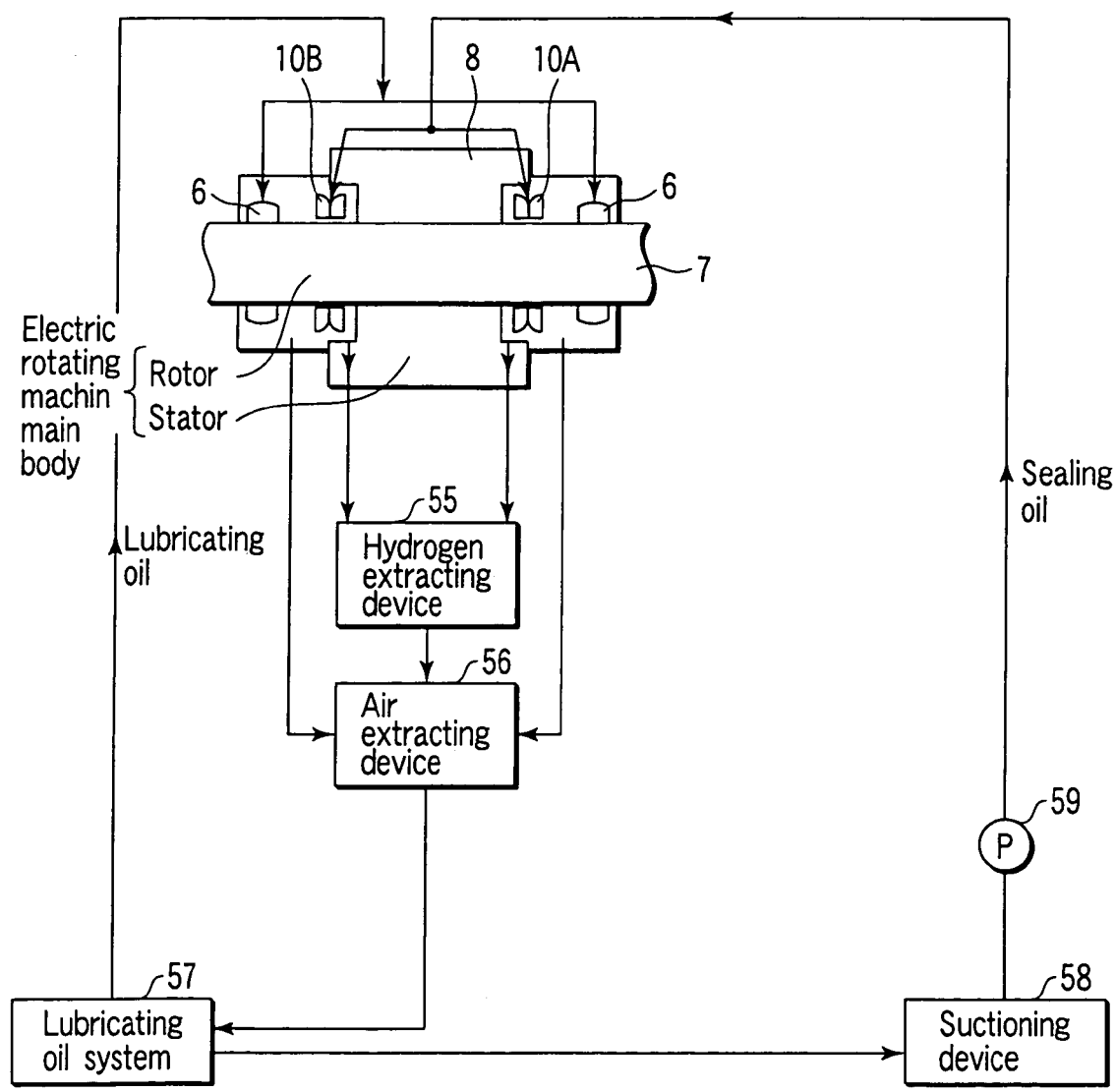
FIG. 31 is a pipeline system drawing of a bearing device and a sealing medium of the conventional electric rotating machine.

Accordingly, it is unnecessary to provide the degassing device 58 in the supply system of the sealing oil 17 shown in FIG. 31 for degassing of the sealing oil 17. Thus, the degassing device 58 of the supply system of the sealing oil 17 which has been necessary in the shaft seal device of the prior art electric rotating machine is no longer necessary.

Figure 5:
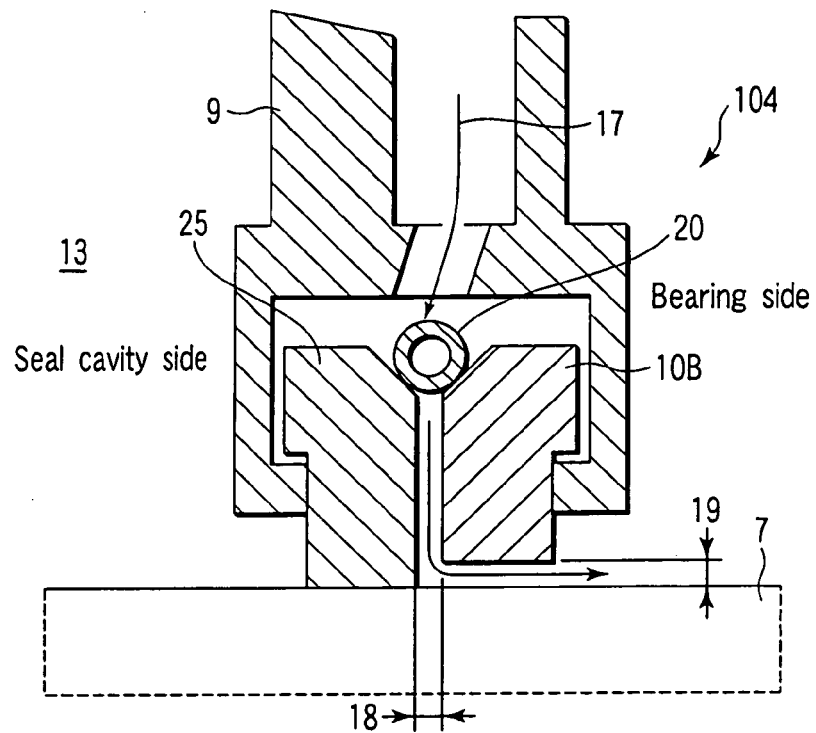
FIG. 5 is a cross-sectional view showing a shaft seal device of an electric rotating machine according to a fifth embodiment of the invention.

Next, a fifth embodiment of an electric rotating machine including a shaft seal device 104 of the invention will be described. As shown in FIG. 5, the seal ring at the seal cavity side is replaced by a brush seal 25, and the brush seal 25 and the seal ring 10B at the bearing side are held by the seal casing 9. There is an axial direction gap 18 between the brush seal 25 and the seal ring 10B, and the outer circumference thereof is pressed by a spring 20. The inner circumference of the brush seal 25 is in contact with the outer circumferential surface of the rotating shaft 7, but there is a circumferential direction gap 19 between the inner circumference of the seal ring and the outer circumference of the rotating shaft 7.

Figure 30:
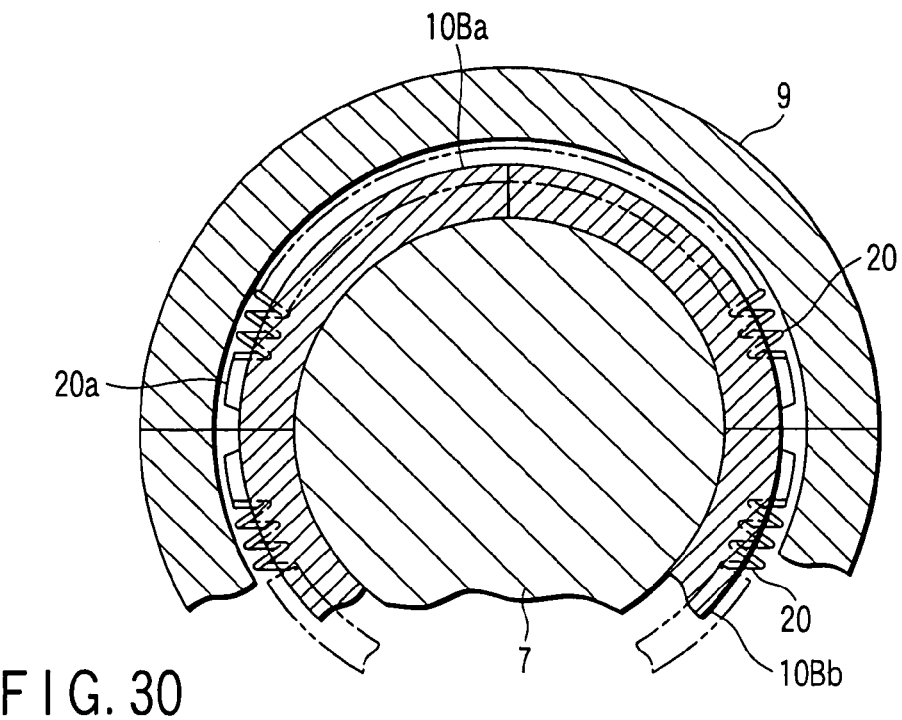
FIG. 30 is a cross-sectional view taken along line 30-30 in FIG. 29 when viewed in the direction of the arrow.

In the embodiment configured in this manner, the sealing oil 17 flows from the axial direction gap 18 out only to the bearing side via the circumferential direction gap 19 between the seal ring 10B at the bearing side and the rotating shaft 7. In addition, the hydrogen gas 8 inside the machine which has entered the seal cavity 13 via the gap between the internal oil deflector 12 and the rotating shaft 7 does not come in directly contact with the sealing oil 17 because of the presence of the brush seal 25, and the air in the sealing oil 17 is not discharged to the hydrogen gas 8, so that the purity of the hydrogen gas 8 in the machine will not be lowered. Accordingly, it is unnecessary to provide the degassing device 58 in the sealing oil supply system 17 shown in FIGS. 30, 31, in order to perform degassing of the sealing oil 17, and thus it is unnecessary for the degassing device 58 in the supply system of the sealing oil 17, which has been necessary in the shaft seal device of the prior art electric rotating machine. Furthermore, because the hydrogen gas does not enter the seal cavity 13 because of the brush seal 21A, the degassing device 58 is not required.

Figure 6:
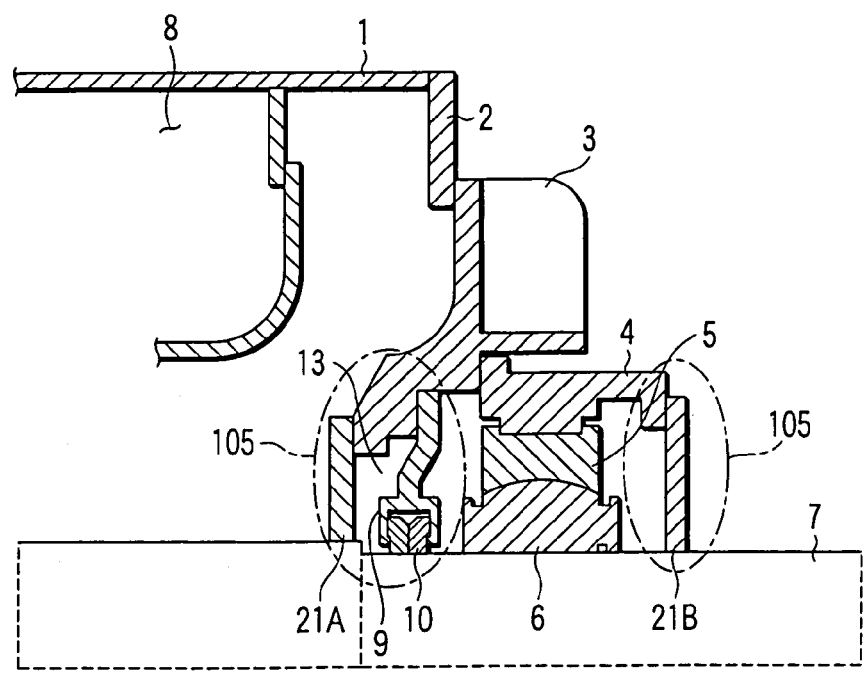
FIG. 6 is a cross-sectional view showing a shaft seal device of an electric rotating machine according to a sixth embodiment of the invention.

Next, a sixth embodiment of an electric rotating machine including a shaft seal device 105 of the invention will be described. As shown in FIG. 6, the internal oil deflector 12 and the external oil deflector 11 are replaced by brush seals 21A and 21B, and these may be obtained in the same manner by attaching the end bracket 3 and the bearing bracket 4. According to the embodiment of FIG. 6, because the oil deflectors 11 and 12 are not provided, component parts are less and this leads to reduced cost.

Figure 7:
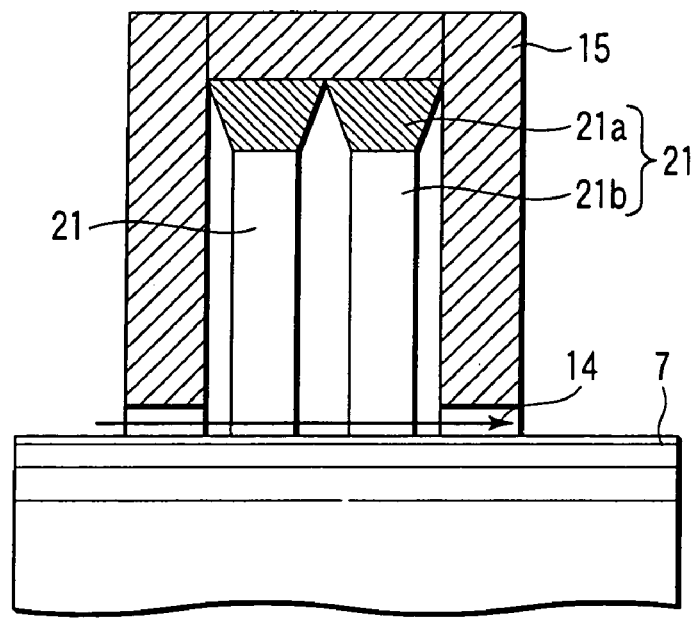
FIG. 7 is a view showing a schematic configuration according to a seventh embodiment of the invention.

FIG. 7 is a view showing a schematic configuration according to a seventh embodiment of the invention. As shown in FIG. 7, the brush seal mechanism comprises the brush holder 15 and a brush seal mechanism main body.

Figures 8A, 8B:
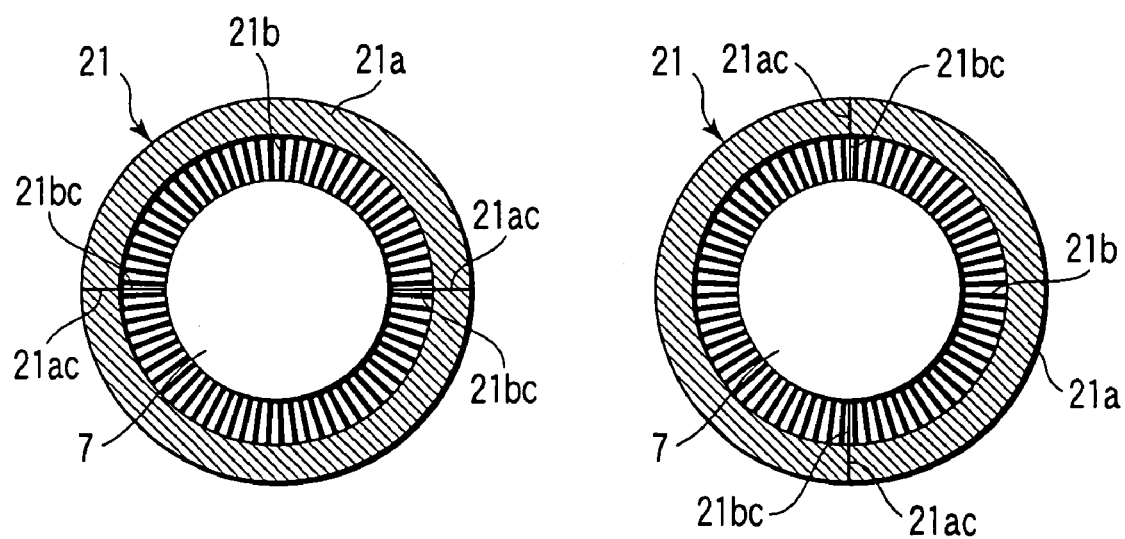
FIGS. 8A and 8B are views each showing a front surface configuration of a brush according to the seventh embodiment shown in FIG. 7.

The brush holder 15 encloses the inner part of the frame of the dynamo-electric device and/or the outer part of the frame of the dynamo-electric device and the outer circumferential side of the rotating shaft 7, and a predetermined storage space is formed therein. The brush seal mechanism main body is contained such that a plurality of stages of brush seals 21 are formed along the axial direction of the rotating shaft 7 which is inside the brush holder 15, and each of the brush seals 21 has a circular ring shaped brush 21b which contacts the rotating shaft 7, and has a base end support portion 21a which supports the brush seal at the reverse rotating shaft side. As shown in FIGS. 8A and 8B, each of the brush seals 21 is radially divided into a plurality of stages along the radial direction, and the positions of the division 21ac of the base end support portion 21a and the division 21bc of the brush 21b at the adjacent stages are offset, so that the cooling gas in the frame does not leak outside the frame. FIGS. 8A and 8B each show a configuration of the two brushes 21 shown in FIG. 7 when viewed from the axial direction, and they are formed as circles enclosing the rotating shaft 7. In addition, as shown in FIGS. 8A and 8B, the brush seal is divided in 2 (or into a number of 3 or more) in the axial direction due to the assembly. In this case, because a gap is formed in the division, there is the possibility that a large volume oil leakage 14 in FIG. 7 occurs at this point.

Then, the brush seal 21 is disposed along the axial direction of the rotating shaft in two stages or in a plurality of stages, and the position of the division 21ac and 21bc of the brush seal 21 is offset in the circumferential direction to be contained in the brush holder, whereby the leakage 14 from the division can be reduced.

It is to be noted that as shown in FIG. 7, the width of a clamp portion that is provided at the base end support portion 21a of the brush seal 21 is larger than the brush 21b, and thus a gap is formed between the brush holder 15 and the brush seal 21 and between the brushes 21b.

For this reason, dropping (bending) of the brush seal 21 occurs due to the pressure of the oil from the high pressure portion toward the low pressure portion, a gap is formed between the rotating shaft 7 and the front end of the brush 21b, and a suitable pressuring (rotating shaft internal diameter—brush internal diameter) can no longer be maintained.

FIG. 9 is a view for explaining the seventh embodiment of the invention which has been conceived for solving these problems. The inner circumferential portion of the brush holder 15 has a drop prevention member 35 (step) which prevents the brush seal 21 from dropping. In this manner, by nipping the brush 21 due to the action of the drop prevention member 35, dropping of the brush seal 21 is prevented, and pressure resistance and excellent sealing capabilities are obtained.

FIG. 10 is a view for explaining an eighth embodiment of the invention. The brush seal 21 has a moveable drop prevention member 26 for optionally changing the nipping width of the brush seal 21, and the push-out amount of the drop prevention member 26 can be adjusted by the adjusting screw 28. With this configuration, a suitable nipping width can be provided.

The brush 21 which has several stages has gaps between the brushes 21 as shown in FIG. 7. There is the possibility that a liquid which leaks from the divisions 21ac and 21bc of the first stage brush seal 21 passes through the gap, flows in the circumferential direction of the rotating shaft, and leaks to the next division.

In this manner, there is the possibility that the liquid may reach the last stage and leak. This gap can be made smaller in the embodiments shown in FIGS. 9 and 10, but it is expected quite a large amount of gap will remain as shown in FIGS. 9 and 10.

Figure 11:
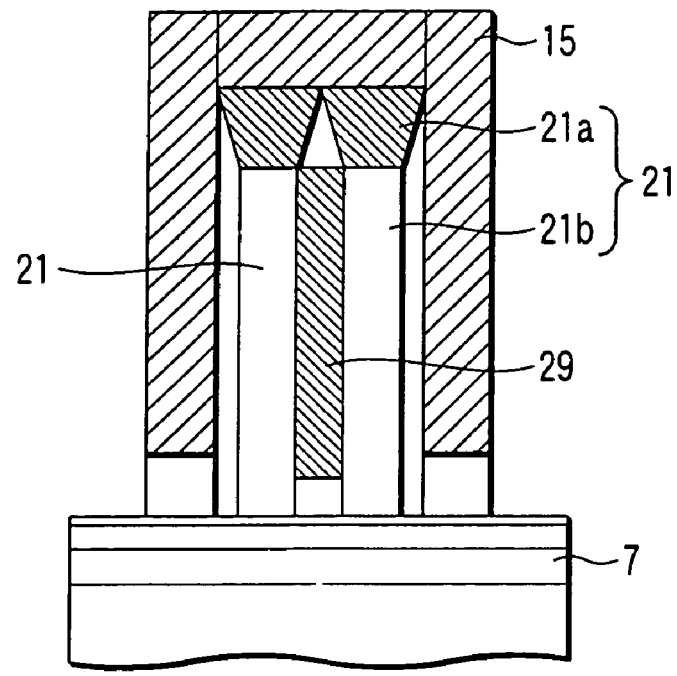
FIG. 11 is an explanatory view showing means for covering a gap between brushes according to a ninth embodiment of the invention.

FIG. 11 is a view for explaining a ninth embodiment of the invention which has been conceived for solving this problem, in which sealing plates 29 served as spacing members 29 are provided which alternate between a plurality of brush seals 21. As a result, there is little or no gaps between the brushes 21, the paths for leakage of a fluid is covered, and the amount of leakage is reduced.

Figure 12:
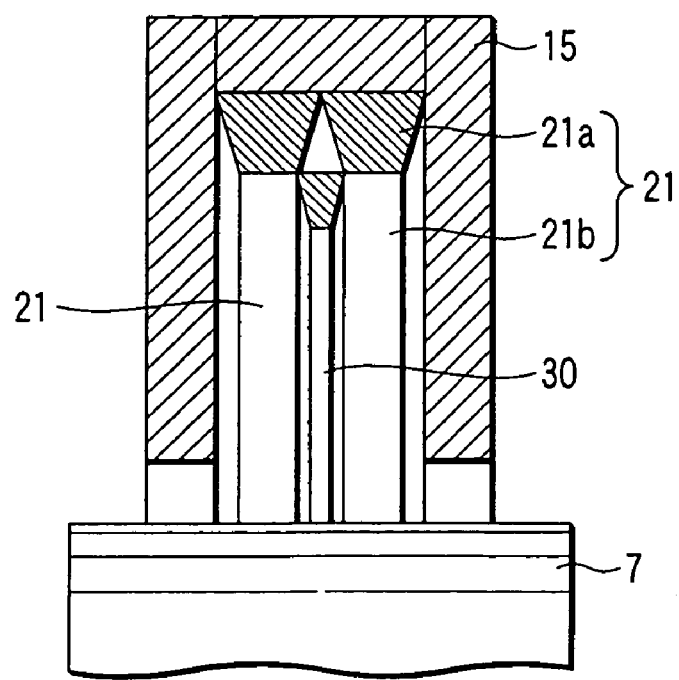
FIG. 12 shows tenth embodiment and is an explanatory view showing another means for covering the gap between the brushes according to the ninth embodiment shown in FIG. 11.

FIG. 12 is a view for explaining a tenth embodiment of the invention, in which the spacing member 29 shown in FIG. 11 is replaced by a small brush 30 which contacts the rotating shaft 7, thereby achieving the same effect as that in FIG. 11.

Hereinafter, an eleventh embodiment will be explained. The brush seal 21 and the rotating shaft 7 need to be maintained in a concentric state during operation, but the concentric state may be different from that at the time of assembly due to lifting up of the rotating shaft 7 or by thermal deformation of the holder 15.

Figure 13:
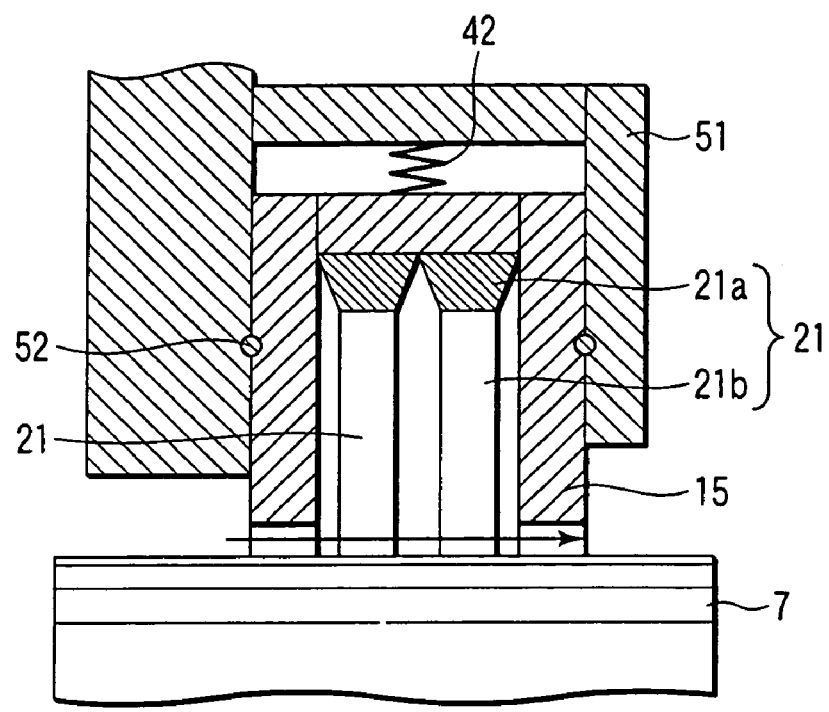
FIG. 13 is an explanatory view showing means for maintaining a concentric state of a rotating shaft and a brush according to a eleventh embodiment of the invention.

FIG. 13 is a view for explaining an eleventh embodiment of the invention which is a measure for dealing with this problem. A holder support casing 51 is provided, the seal mechanism is contained inside the casing 51, and a plurality of locations on the cylinder are supported by a spring 42 so as to be movable in the radial direction. Consequently, the sealing mechanism is returned to the concentric position due to the reactive force of the brush seal 21 in the bias direction of the rotating shaft 7.

Figure 14:
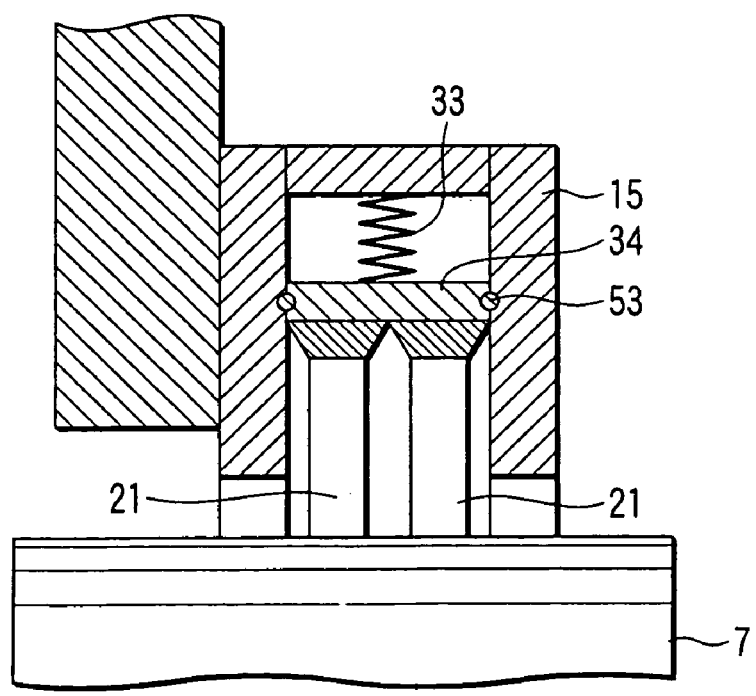
FIG. 14 shows twelfth embodiment and is an explanatory view showing another means for maintaining the concentric state of the rotating shaft and the brush according to the tenth embodiment shown in FIG. 14.

FIG. 14 is a view for explaining a twelfth embodiment of the invention, in which the functions of FIG. 13 are realized by another structure. That is, a support plate 34 is mounted on the outer circumferential surface of the brush seal 21 and is supported by a spring 33 between the spring plate 34 and the brush holder 15. It is to be noted that packing 53 is provided the slide surface between the brush holder 15 and the support plate 34, thereby preventing leakage from the slide surface.

Figure 15:
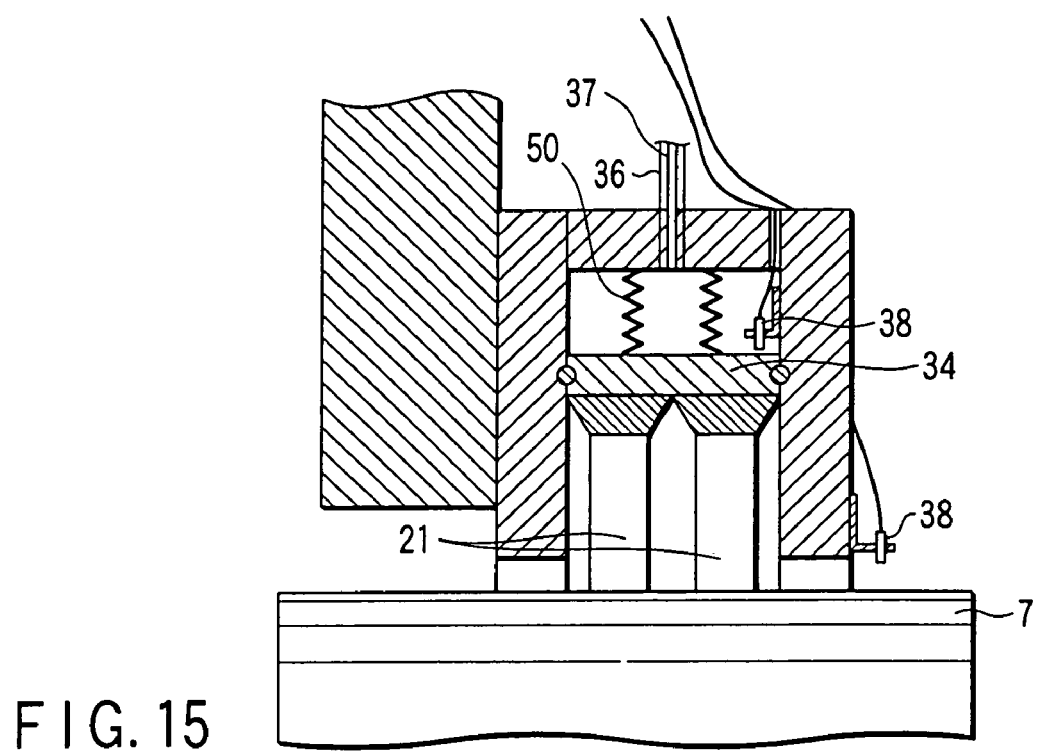
FIG. 15 shows thirteenth embodiment and is an explanatory view showing a method of externally controlling the rotating shaft and the brush to be maintained in a concentric state according to the tenth embodiment of the invention shown in FIGS. 13 and 14.

FIG. 15 is a view for explaining a thirteenth embodiment of the invention. The spring 33 in FIG. 14 is replaced by bellows 50, and a gap sensor 38 for detecting relative positions of a pipe 36 for feeding and discharging a high pressure fluid 37 in the bellows 50, the rotating shaft 7 and the brush 21, so that the concentric state can be controlled externally.

The bias state of the rotating shaft 7 and the brush holder 15 can be measured by the gap sensor 38 mounted on the brush holder 15. The pressure fluid is supplied or discharged so as to lower the pressure in the bellows 50 which have been biased so as to cancel the bias amount or so as to increase the pressure inside the bellows 50 at the opposite side, and the length of the bellows 50 is thereby adjusted.

By disposing four gap sensors 38 and bellows 50 at least on the circumference at a pitch of 90°, bias in any direction can be handled.

Figure 16:
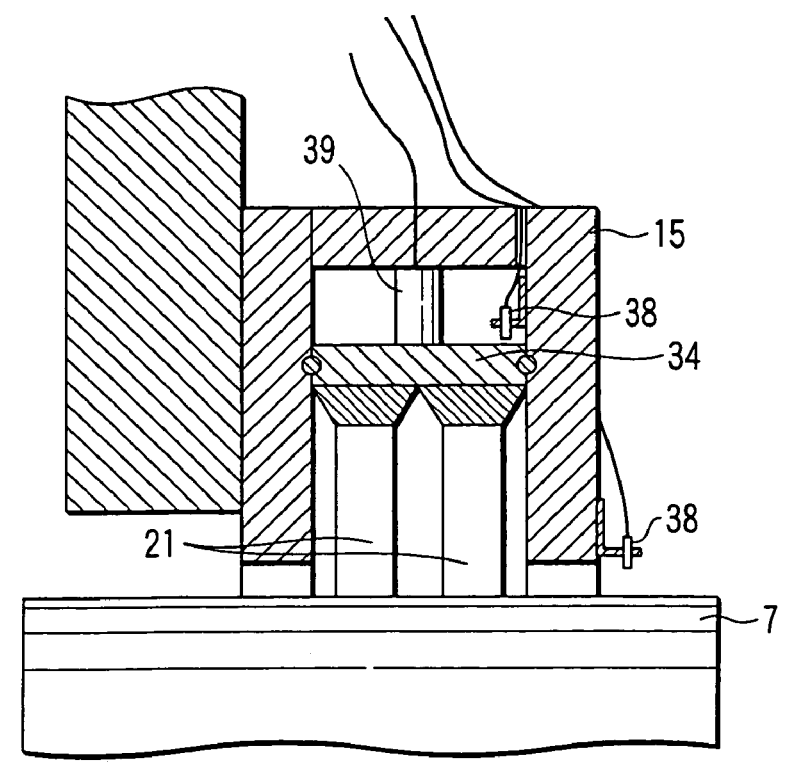
FIG. 16 shows fourteenth embodiment and is an explanatory view another method of externally controlling the rotating shaft and the brush to be maintained in a concentric state according to the tenth embodiment of the invention shown in FIGS. 13 to 15.

FIG. 16 is a view for explaining a fourteenth embodiment of the invention. The bellows 50 in FIG. 15 are replaced by a piezoelectric element 39, the length thereof is controlled by changing the voltage applied to the piezoelectric element 39, and the same functions as those of FIG. 15 are thereby achieved.

Figure 17:
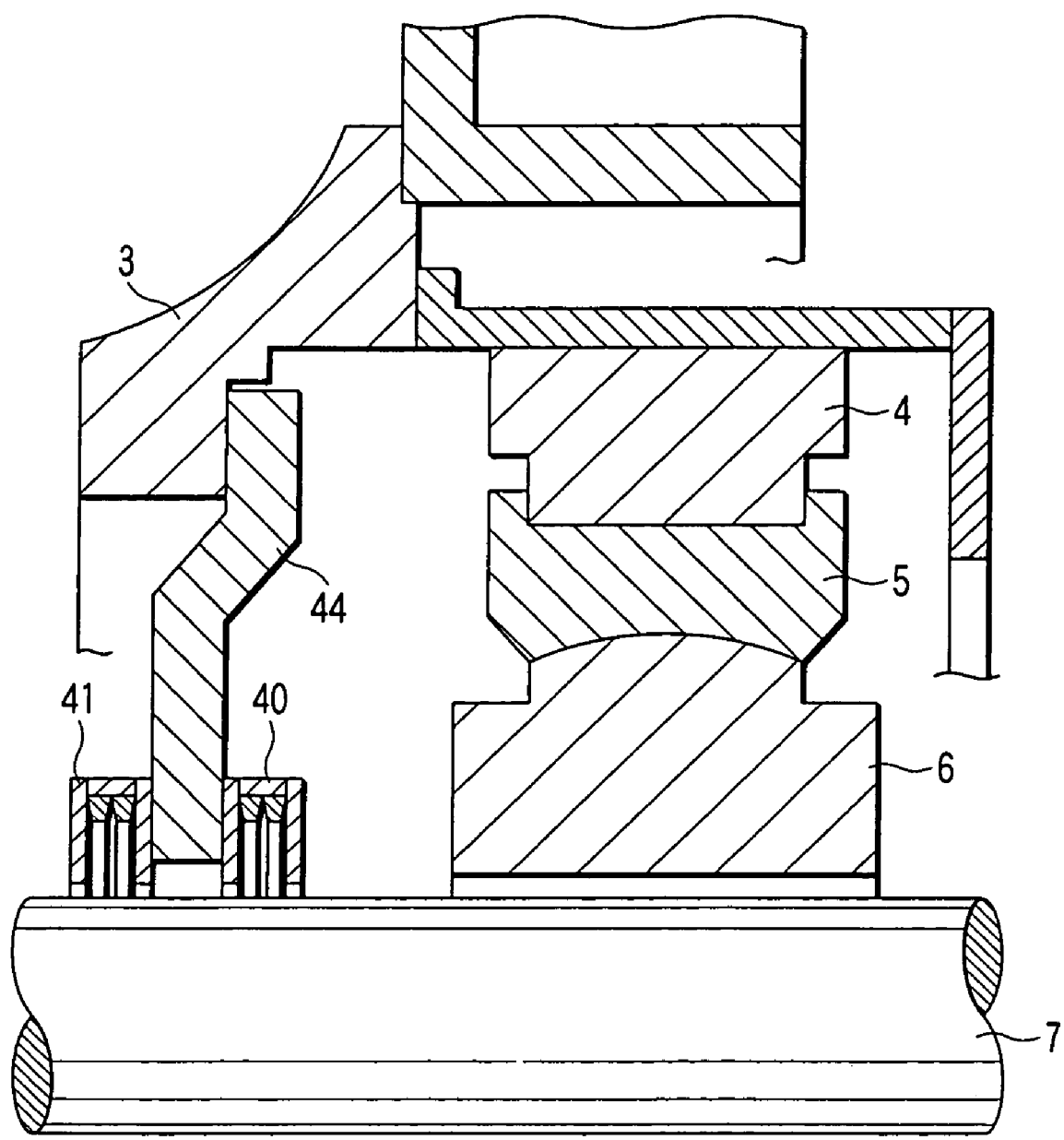
FIG. 17 shows a fifteenth embodiment of the invention and a configuration which shows a method of applying a brush type contact seal to a turbine generator.
Figure 18:
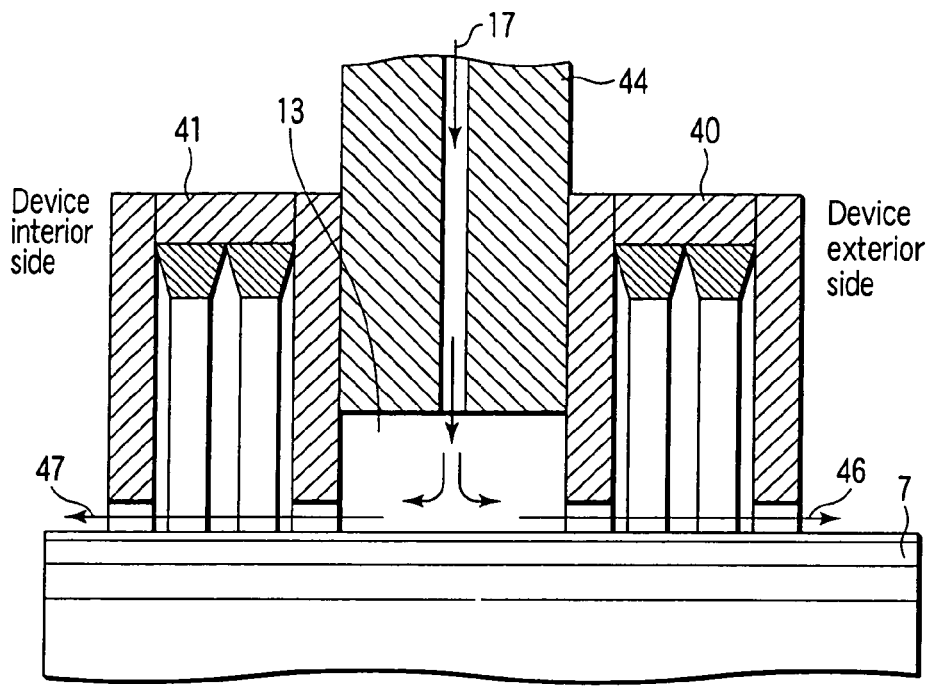
FIG. 18 shows the fifteenth embodiment shown in FIG. 17 and a structure when the brush type contact seal is applied to the turbine generator.

FIGS. 17 and 18 each show a fifteenth embodiment of the invention in which a brush type contact seal device is applied to a turbine generator. The contact seal device is provided as contact seals 40 and 41 outside the machine and inside the machine of a seal mounting seat 44 which is mounted on the inner circumference of the bearing bracket 4. The contact seal device supplies the sealing oil 17 between the contact seals 40 and 41 to seal the hydrogen gas 8 inside the machine.

The application of the fifteenth embodiment, that is, the contact type seal ring device makes it possible to decrease increase in an excessive sealing oil amount generated in the floating seal of the prior art system or rubbing vibration caused by frictional force.

Figure 19:
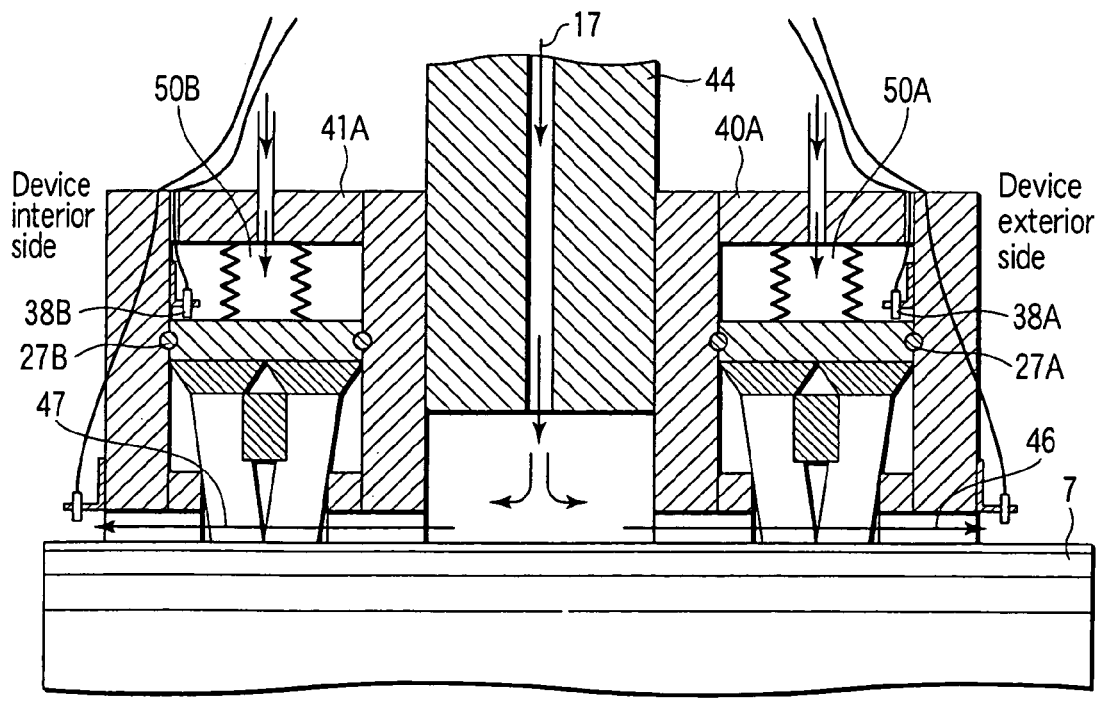
FIG. 19 shows the sixteenth embodiment and the structure when the brush type contact seal is applied to the turbine generator.

FIG. 19 is a view for explaining a sixteenth embodiment of the invention. In addition to the seal mounting seat 44 provided at the inner circumference edge of the end bracket 3 shown in FIG. 17, brush type contact seals 40A and 41A are provided at both inside the machine and outside the machine as shown in FIG. 15. Examples of other possible configurations naturally include gap sensors 38 and 38B, bellows 50A and 50B, and packings 27A and 27B. In this case also, the same effects as those in FIG. 15 are obtained.

Figure 20:
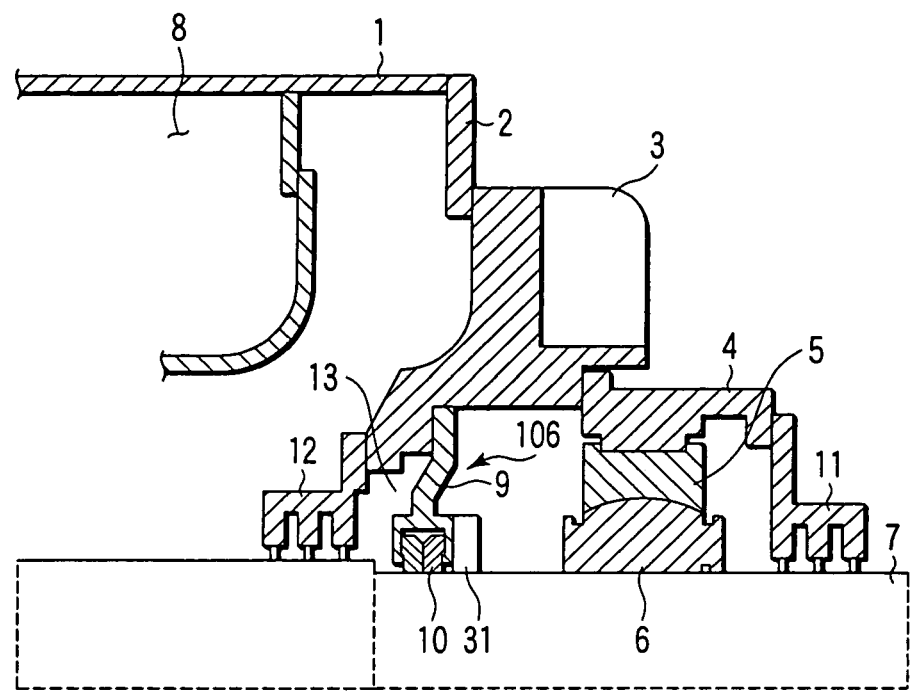
FIG. 20 is an axial direction cross-sectional view of an area around a shaft seal device according to a seventeenth embodiment of the invention.

FIG. 20 is an axial direction cross-sectional view of a seal ring device area of a dynamo-electric device for explaining a seventeenth embodiment of the invention. The embodiment differs from the prior art shown in FIG. 28 in that a seal mechanism 31 comprising a brush seal is mounted at the side surface opposing the bearing 6 of the seal casing 9 which is mounted on the end bracket 3 of the prior art, so that the brush seal contacts the outer circumferential surface of the rotating shaft. Aside from this, the structural elements are the same as those of FIG. 28, and the basic effects of the shaft seal device (which comprises the seal casing 9 and seal ring 10) are exactly the same.

In the embodiment of FIG. 20 thus configured, the sealing oil 17 supplied to the gap between the seal ring 9 and the rotating shaft 7 configuring the prior art shaft seal device and the lubricating oil supplied to the bearing device (the device comprising the bearing bracket 4, bearing stand 5, and bearing 6) is prevented from being mixed by means of the brush seal 31 which is mounted at the bearing device side of the seal casing 9 of the prior art shaft seal device. Because each of the oils is circulated by a different circulation system, there is no mixing of the oils. Accordingly, the air mixed into the lubricating oil never passes the brush seal 31 and gets discharged inside the prior art shaft seal device. In addition, the hydrogen gas 8 inside the machine which is mixed in the sealing oil 17 never passes the brush seal 31 and gets discharged at the bearing device side. Therefore, the purity of the hydrogen gas 8 in the machine is not lowered due to the air mixed in the sealing oil 17, so that it is unnecessary for degassing of the sealing oil 17 and thus it is unnecessary to provide the degassing device 58 in the lubricant supply system, as is the case of the prior art. The brush seal 31 naturally requires no lubricant according to the properties thereof.

Figure 21:
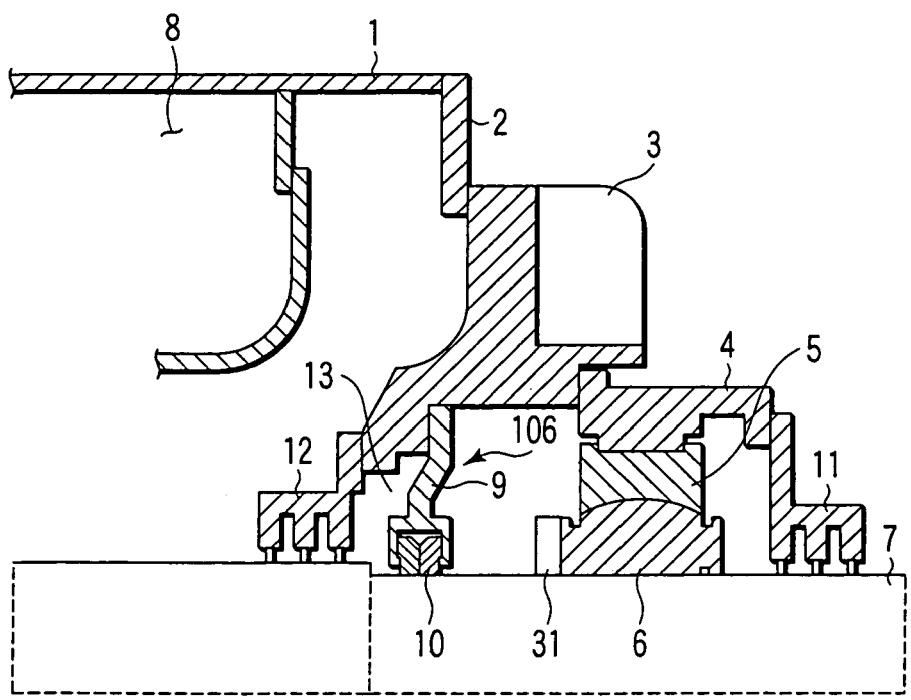
FIG. 21 is an axial direction cross-sectional view of the area around the shaft seal device according to a modification of the seventeenth embodiment of the invention.

FIG. 21 is a view for explaining a modification of FIG. 20, in which the brush seal 31 shown in FIG. 20 is not mounted at the side surface of the seal casing 9 of the shaft seal device but at the opposite surface to the seal casing 9 which is the side surface of the bearing 6. The same effects can be obtained as in the case of FIGS. 21 and 22.

Next, an eighteenth embodiment of the electric rotating machine including the shaft seal device of the invention will be described with reference to FIGS. 22, 23, 24, and 25. FIG. 22 is an axial direction cross-sectional view of an area around the shaft seal device of the electric rotating machine according to the eighteenth embodiment of the invention. The embodiment differs from the prior art shown in FIG. 2 in that mounting is at the side surface opposite to the external oil deflector 11 which is the side surface of the bearing 6. Aside from this, the structural components are the same as those of FIG. 28, and the basic effects as the shaft seal device 107 are exactly the same as those of the prior art.

In the thus configured eighteenth embodiment, by providing the brush seal 31 at the side surface of the shaft end side of the bearing 6 of the bearing device, the sealing oil 17 supplied to the prior art bearing device and the lubricating oil supplied to the bearing device never come in contact with the outside air. Air does not mix with these oils, and only mixes with the cooling hydrogen gas 8 which contacts inside the machine, and thus, air is never discharged from these oils to the hydrogen gas 8 inside the machine. Accordingly, the purity of the hydrogen gas 8 inside the machine is never lowered and degassing of the sealing oil 17 is not required, so that it is unnecessary for the lubricant supply system shown in FIG. 30 to have the degassing device 58.

FIG. 23 shows an example in which the brush seal 31 is provided at the side surface of the external oil deflector 11 inside the machine rather than at the side surface of the shaft end side of the bearing 6. As shown in FIG. 23, by providing the brush seal 31 at the side surface of the external oil deflector 11 outside the machine, the lubricating oil also lubricates the side surface of the shaft end side of the bearing 6, and the cooling capability of the bearing device is not reduced.

FIG. 24 shows an example in which the brush seal 31 provided at the shaft end side of the external oil deflector 11 rather than at the side surface of the shaft end side of the bearing 6. In the case where the brush seal 31 is provided at the shaft end side of the external oil deflector 11 as shown in FIG. 24, the mounting of the brush seal 31 is easy and it may also be used for a device which has already been designed.

FIG. 25 shows an example in which a brush seal holder 23 is mounted on the axial end side which is the side surface of the bearing bracket 4 instead of the external oil deflector 11, and the brush seal 31 is provided at the brush holder 23. In the configuration in which the brush seal 31 is mounted in place of the external oil deflector 11 as shown in FIG. 25, there are less component parts and thus reduced cost.

Figure 26:
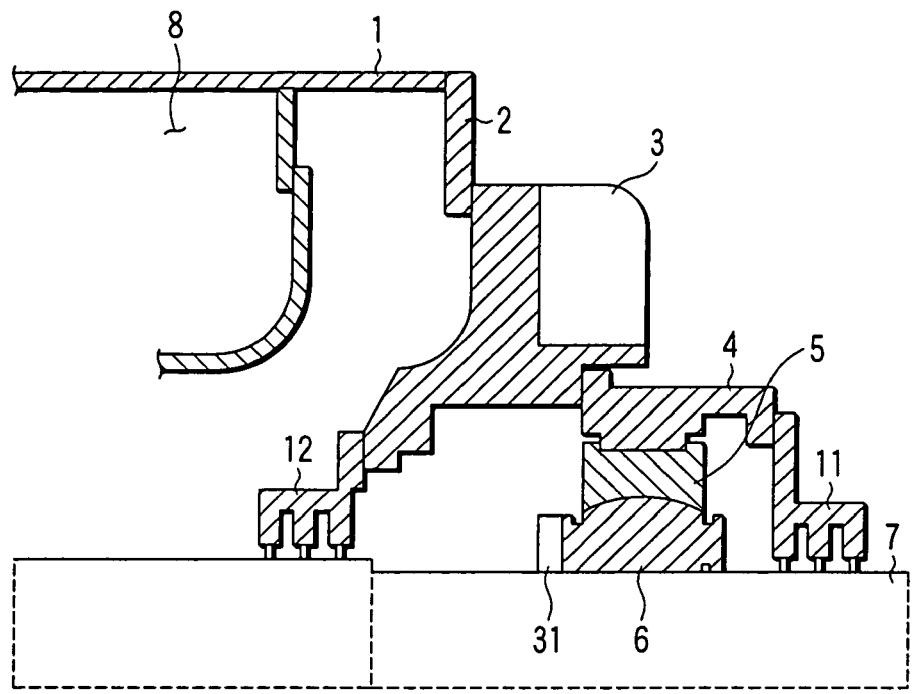
FIG. 26 is an axial direction cross-sectional view of an area around a shaft seal device according to a nineteenth embodiment of the invention.
Figure 27:
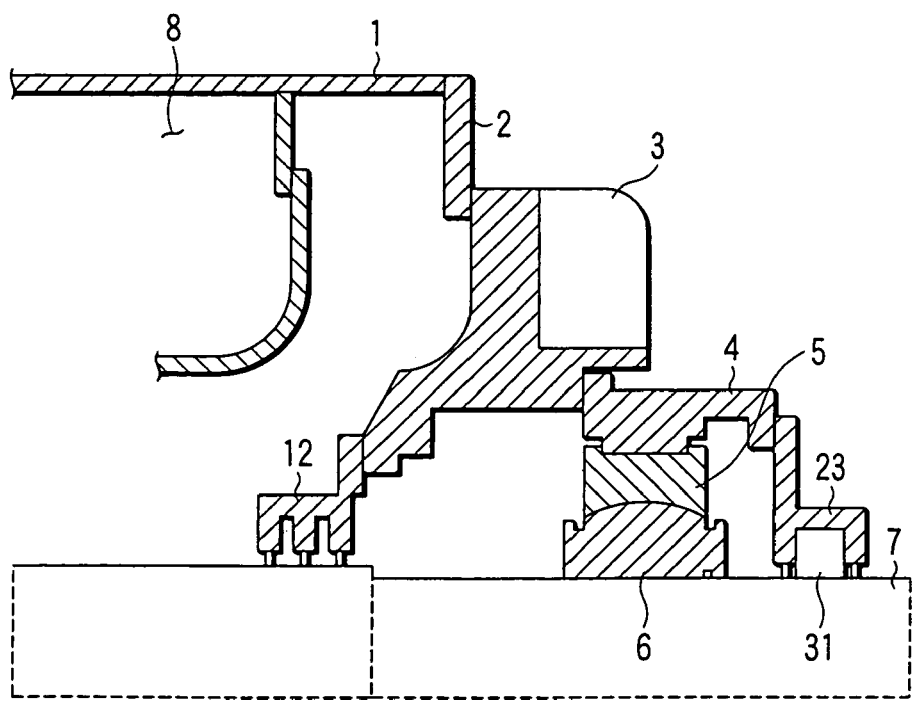
FIG. 27 is an axial direction cross-sectional view of an area around a shaft seal device according to another embodiment of the nineteenth embodiment of the invention.

Next a nineteenth embodiment of an electric rotating machine of the invention will be described with reference to FIGS. 26 and 27. FIGS. 26 and 27 are axial direction cross-sectional views of an area around the shaft seal device of the electric rotating machine.

The embodiment differs from the prior art shown in FIG. 28 in that the brush seal 31 is mounted on the side surface of the bearing 6 inside the machine in FIG. 26, the external oil deflector 11 is not provided on the bearing bracket 4, and instead, the brush seal holder 23 with a built-in brush seal 31 is mounted to the bearing bracket 4, and the seal ring 9 which is the prior art shaft seal device is not mounted in FIG. 27. The other structural elements are the same as FIG. 28.

Figure 29:
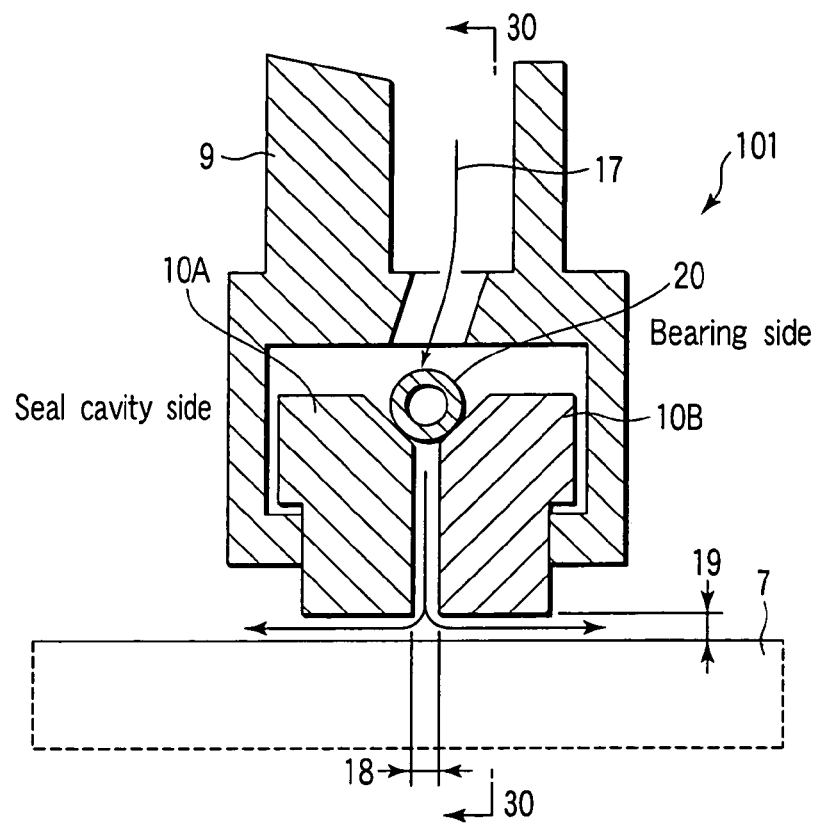
FIG. 29 is a cross-sectional view in which a seal casing portion of FIG. 28 is enlarged.

In the nineteenth embodiment configured in this manner, since the hydrogen gas 8 inside the machine is sealed newly with the brush seal 31 provided on the side surface of the bearing 6 inside the machine not to leak outside of the machine in the configuration of FIG. 26, the hydrogen gas 8 is not leaked outside the machine and does not come in contact with the lubricant supplied to the bearing 6. In the configuration of FIG. 27, the lubricating oil which lubricates the bearing 6 and the hydrogen gas 8 inside the machine are sealed by a brush seal 31 which is newly provided with a shaft end portion such that leakage to the outside the machine does not occur, the brush seal 31 having basically zero of the gap in the radial direction with respect to the rotating shaft 7. Therefore, there is no contact of the lubricating oil with the outside air nor leakage of the hydrogen gas to the outside. Accordingly, even in the case where the lubricating oil is supplied to the bearing 6 again via the circulating device and flows out to the inside of the machine, air is never discharged from the lubrication oil to the hydrogen gas 8 inside the machine and thus, the purity of the hydrogen gas 8 inside the machine is not lowered. Consequently, since it is unnecessary to provide the degassing device 58 in the lubricant supply system shown in FIG. 29 to perform degassing of the lubricant, the degassing device 58 of the oil supply system which has been necessary in the shaft seal device of the prior art electric rotating machine is no longer necessary.

This invention is not limited to the above-described embodiments and may be effected with various modifications. For example, the above-described brush seals 21, 21A, 21B and 31 may be formed of a flame resisting material. By being formed of a flame resisting material, even in the unlikely event that the hydrogen gas 8 leaks and is ignited, the seal portion is not damaged by flame causing an increase in the leak amount of the hydrogen gas 8. It is thus possible for the amount of leakage to be minimized, and thus safety is improved for the electric rotating machine which uses the hydrogen gas 8 as the cooling gas.

This invention may be applied to any of a dynamo-electric device which continuously scavenges a cooling medium, an electric generator having a lubricating system which separately circulates a bearing lubricant and a sealing medium, respectively, and an electric rotating machine for cooling an electric rotating machine by use of a completely sealed cooling medium.

What is claimed is:

1. An electric rotating machine comprising:
   a bearing device in which a rotating shaft having a rotor is rotatably supported inside a frame which contains an electric rotating machine main body;
   a cooling medium circulating system to circulate a cooling medium within the frame to cool the electric rotating machine main body;
   an oil deflector which is disposed on an outer circumferential surface of the rotating shaft which is on at least one of the inner side and the outer side of the frame of the bearing device and which prevents a lubricant supplied to the bearing device from flowing inside the frame or from flowing outside the frame;
   a sealing device which is disposed to form a cavity inside the frame and between the bearing device and the oil deflector at the inner side of the frame, and which supplies a sealing medium to the outer circumferential surface side of the rotating shaft to prevent the cooling medium from leaking to the outer side of the frame; and
   a contact brush seal which is arranged to contact the outer circumferential surface of the rotating shaft, and which prevents contact between (i) the cooling medium and a medium within the seal cavity, (ii) the cooling medium and the sealing medium, (III) the medium within the seal cavity and the seal medium, (iv) the sealing medium and a lubricating medium inside the bearing device, (v) the sealing medium, the lubricating medium inside the bearing device and the outside air, (vi) the sealing medium and the outside air, and (vii) the lubricating medium inside the bearing device and the outside air.

2. The electric rotating machine according to claim 1, wherein the contact brush seal is mounted to one of the oil deflector, the sealing device, or the bearing device.

3. The electric rotating machine according to claim 1, wherein the sealing mechanism contact brush seal is provided in place of the oil deflector.

4. The electric rotating machine according to claim 1, wherein the seal ring device is formed of a plurality of seal rings in the axial direction and the length in axial direction of the seal ring inside the axial directional device is longer than that of the seal ring outside the axial directional device.

* * * * *